May 9, 1967 A. O. FITZNER 3,318,195
CONTROLS FOR MACHINE TOOLS AND THE LIKE
Filed Oct. 4, 1961 18 Sheets-Sheet 1

WORK

INVENTOR
ARTHUR O. FITZNER
by: Wolfe, Hubbard, Voit & Osann
ATTYS.

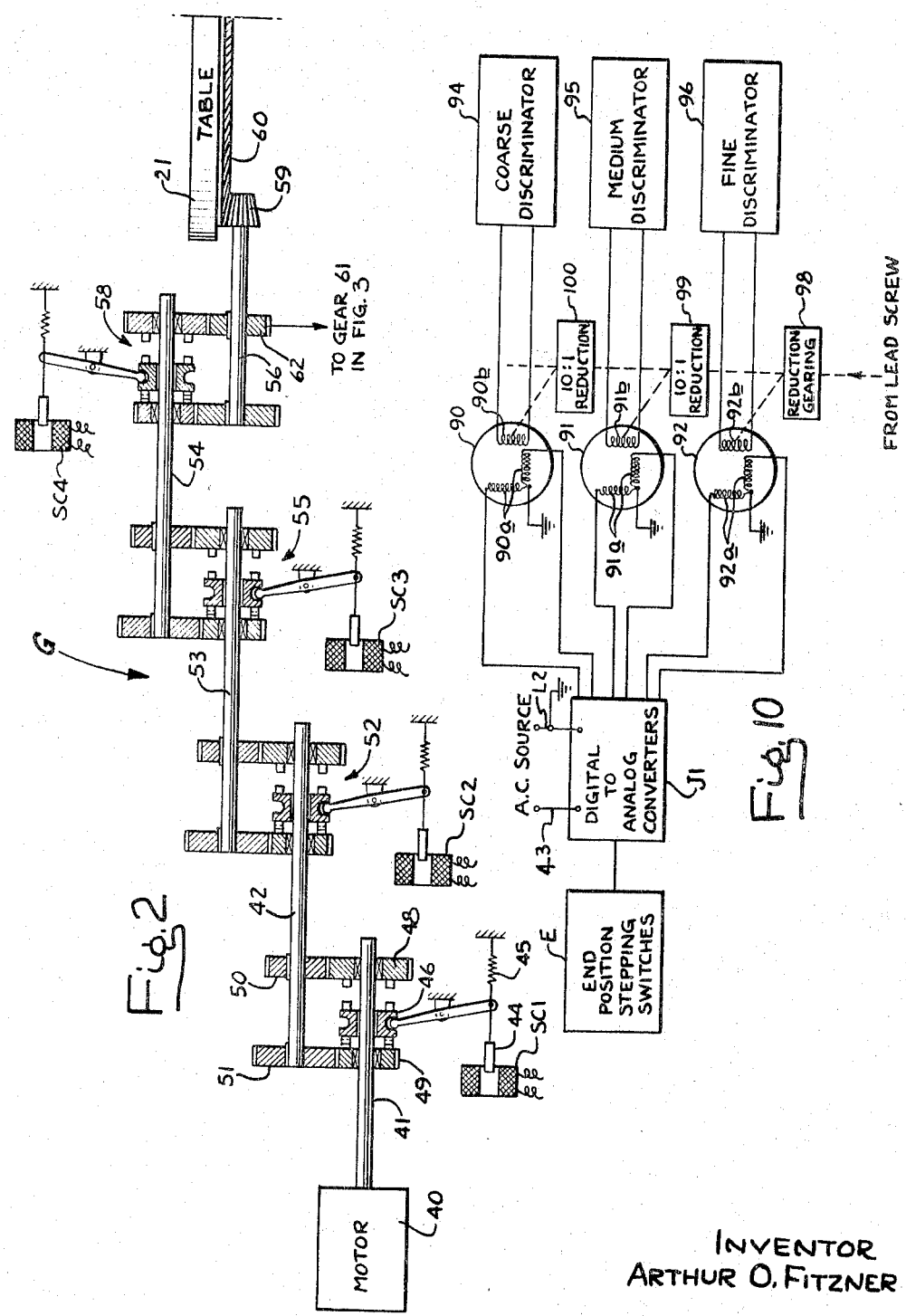

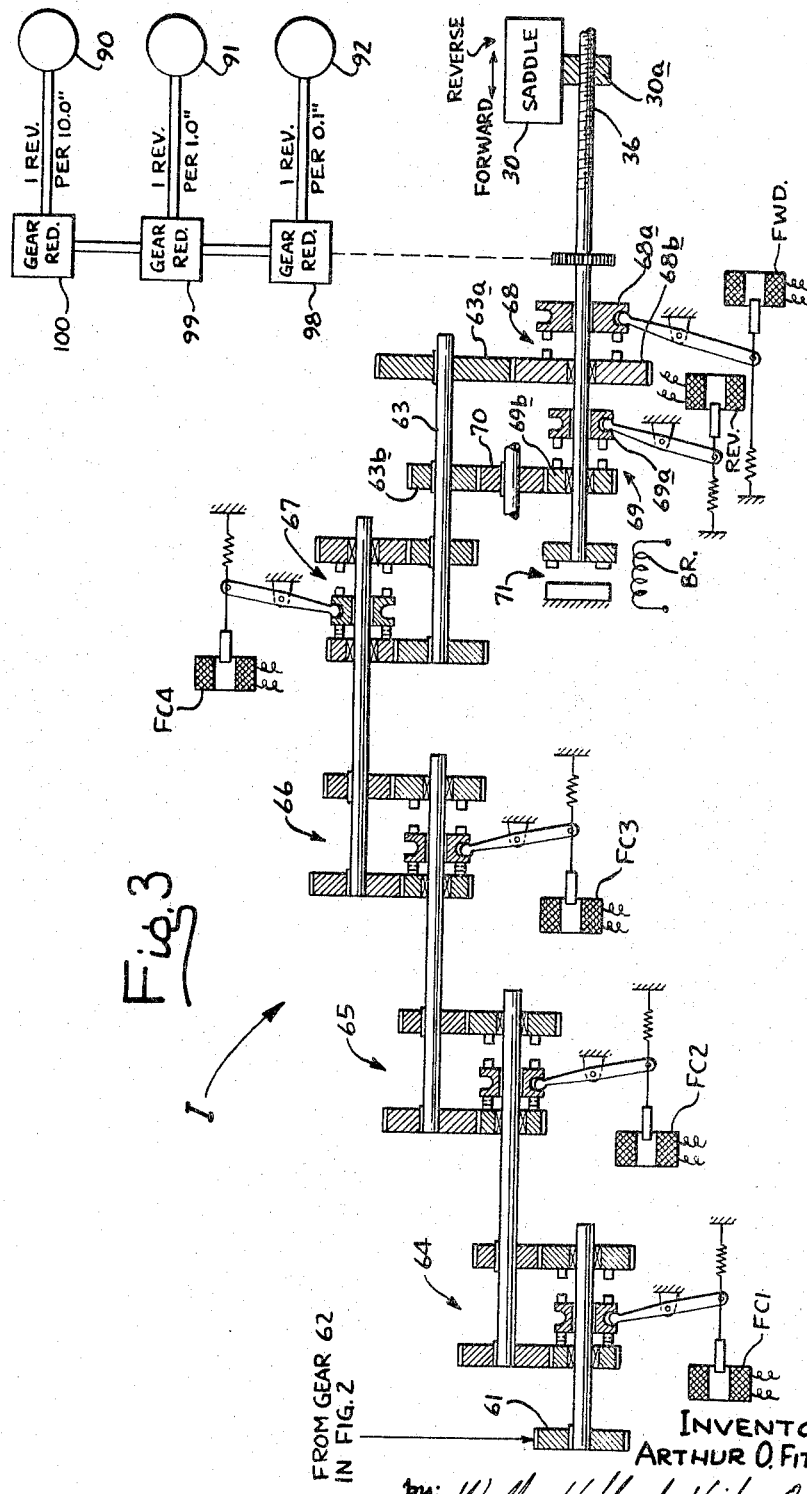

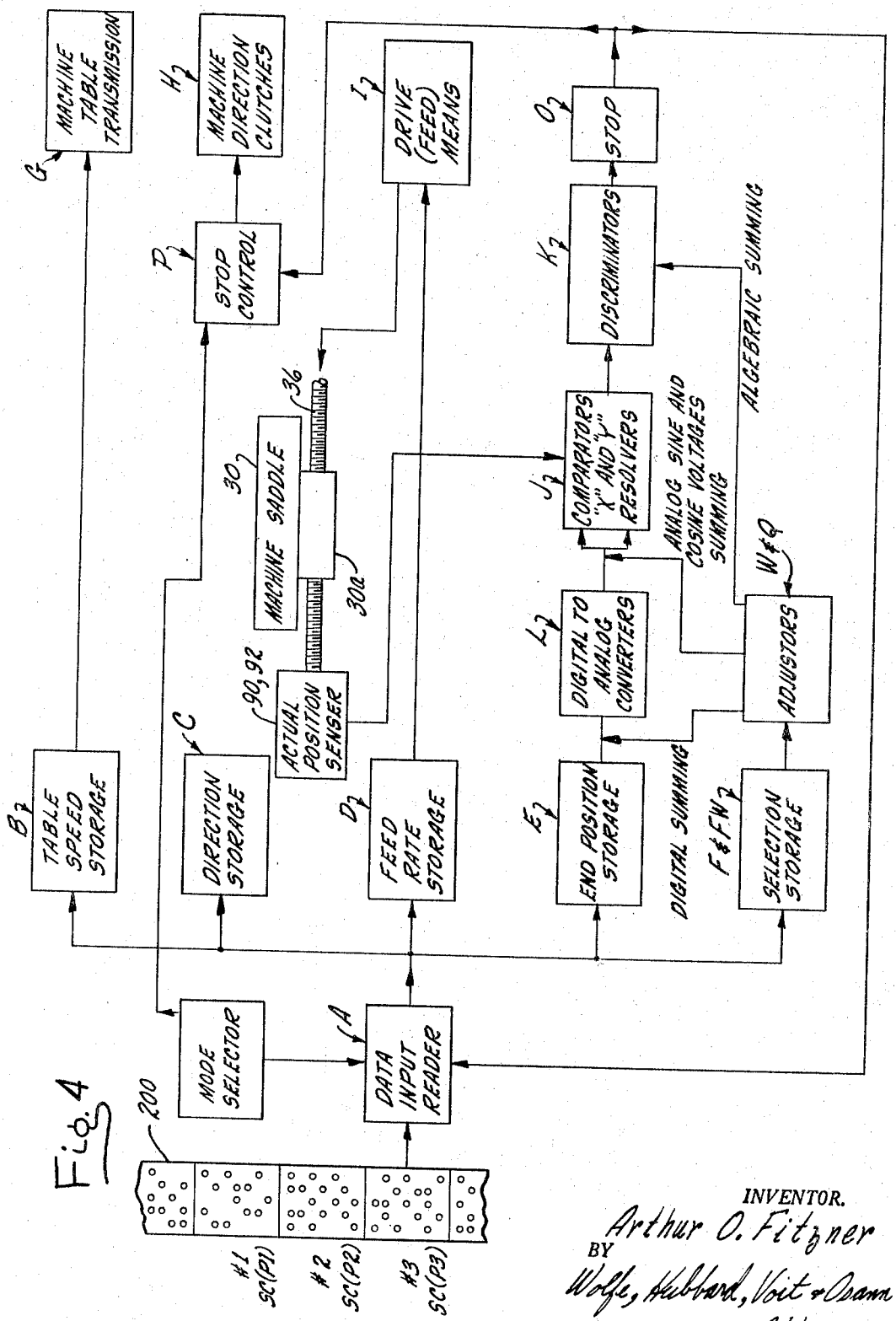

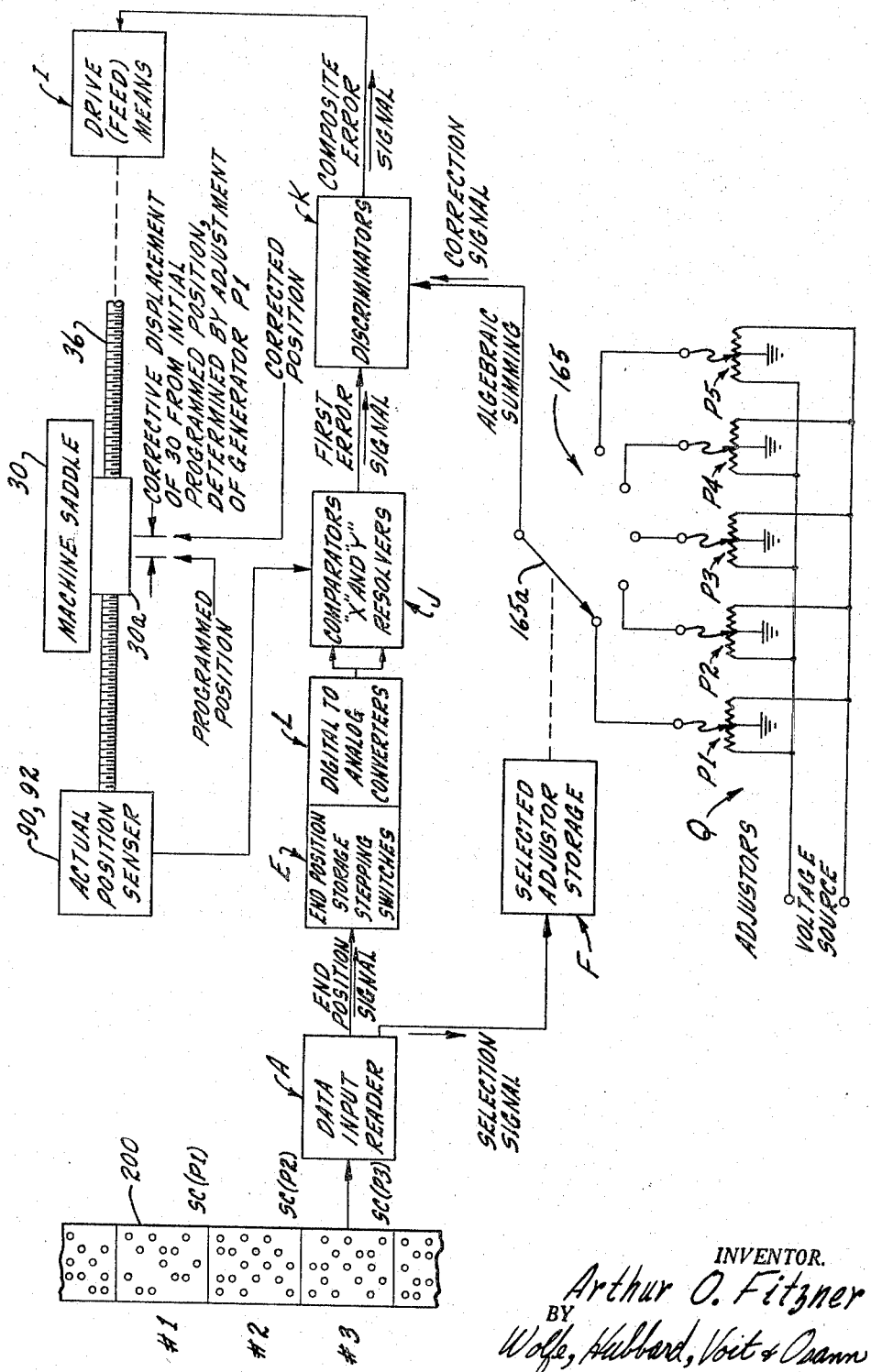

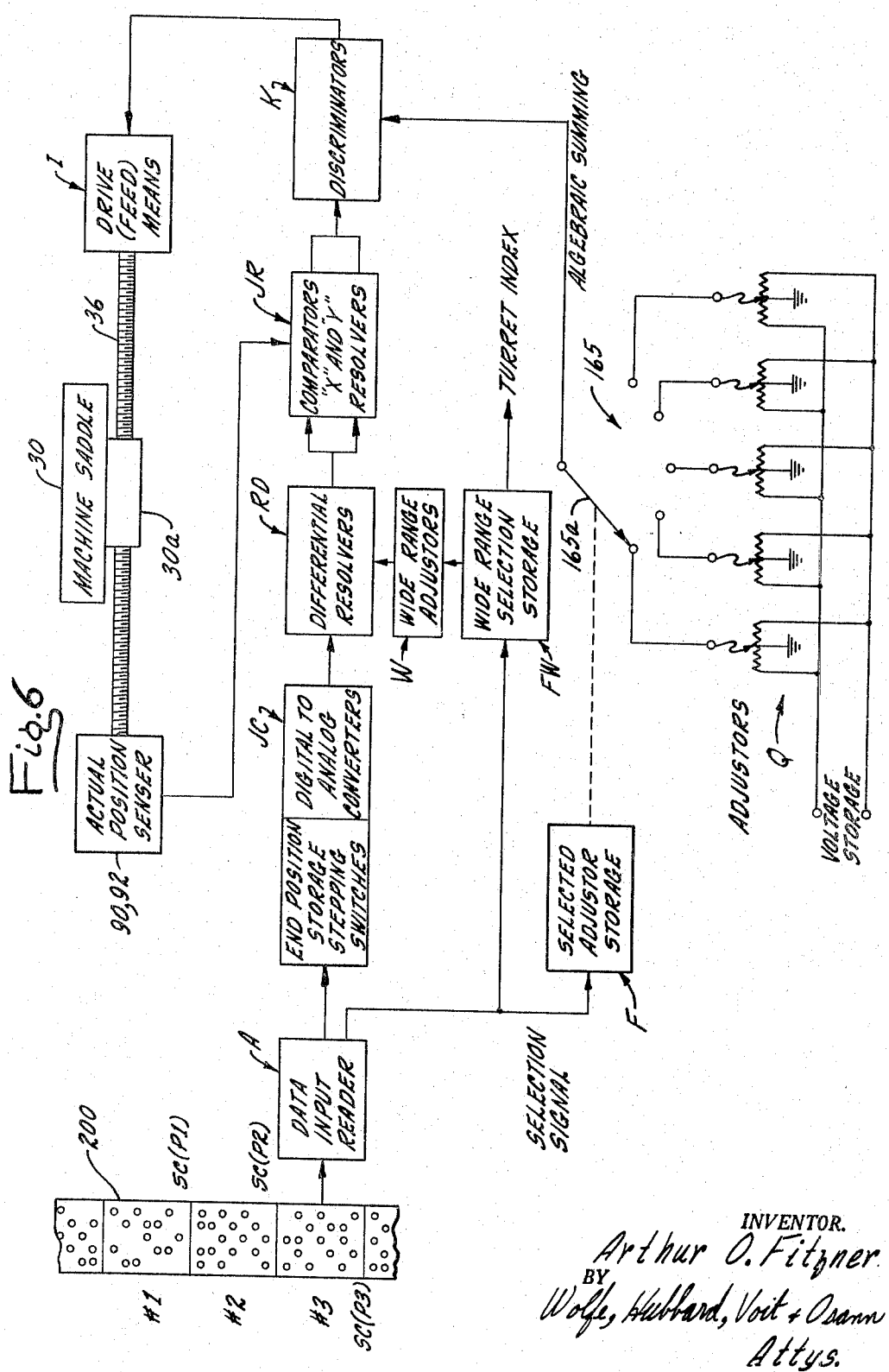

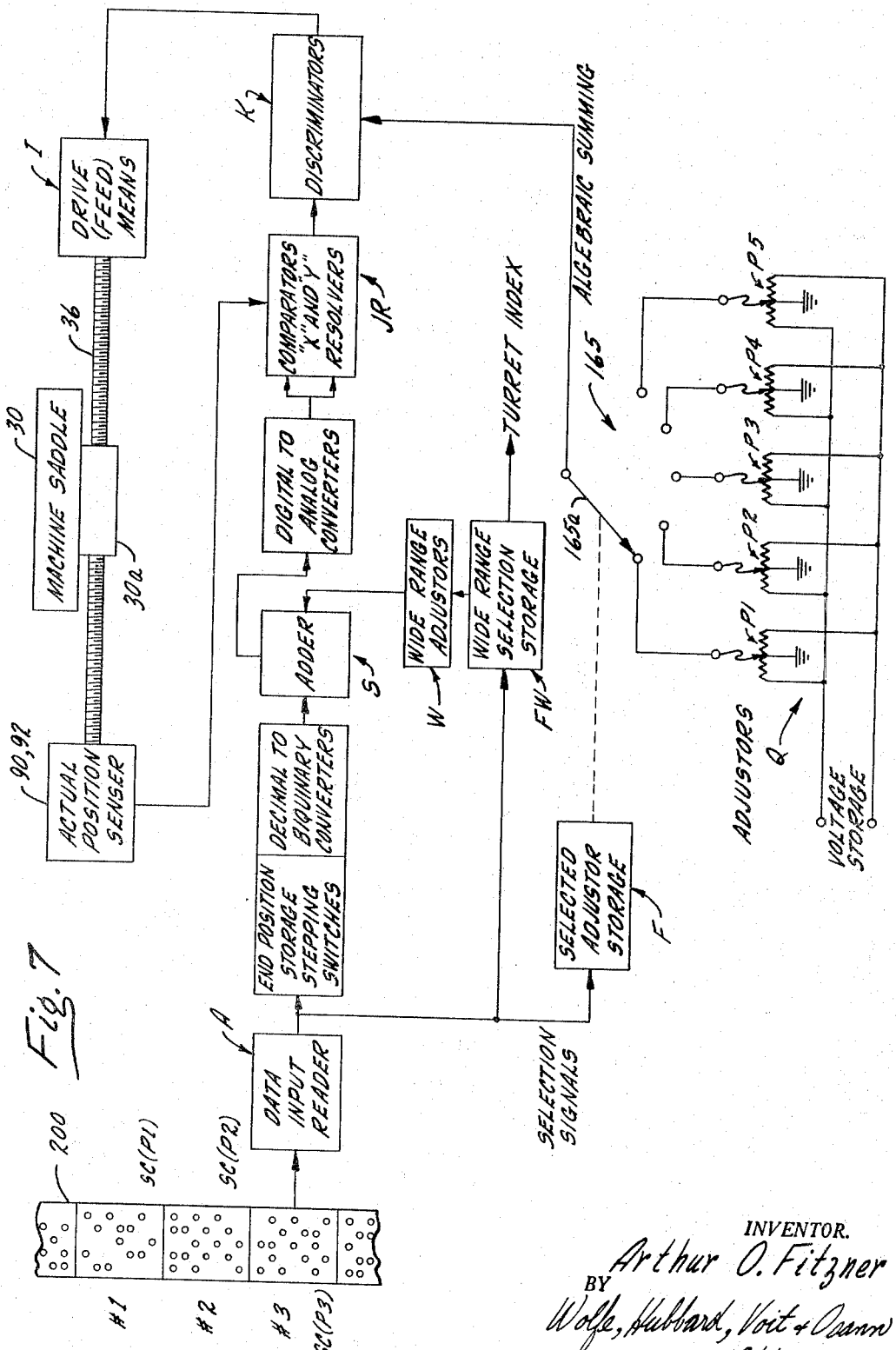

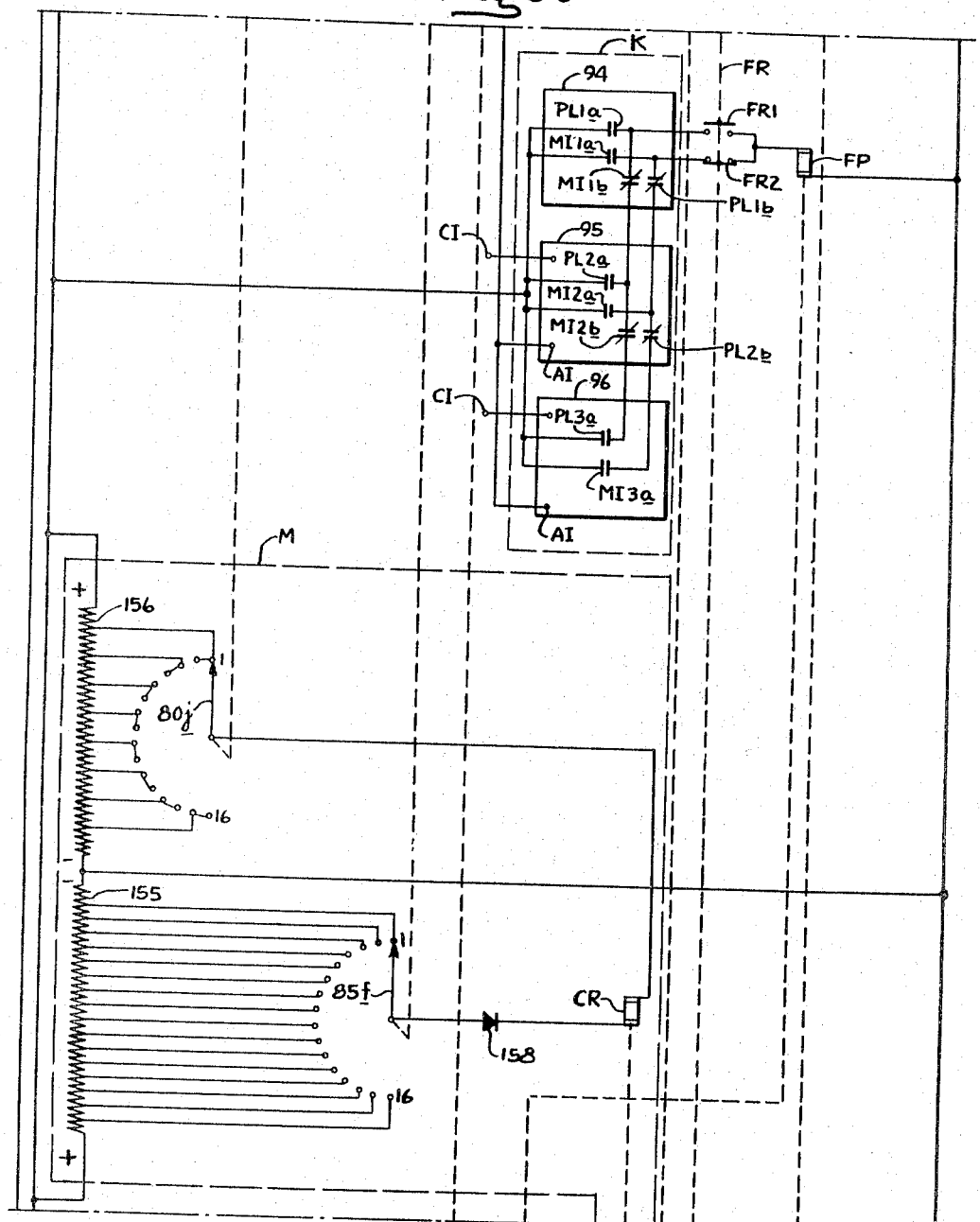

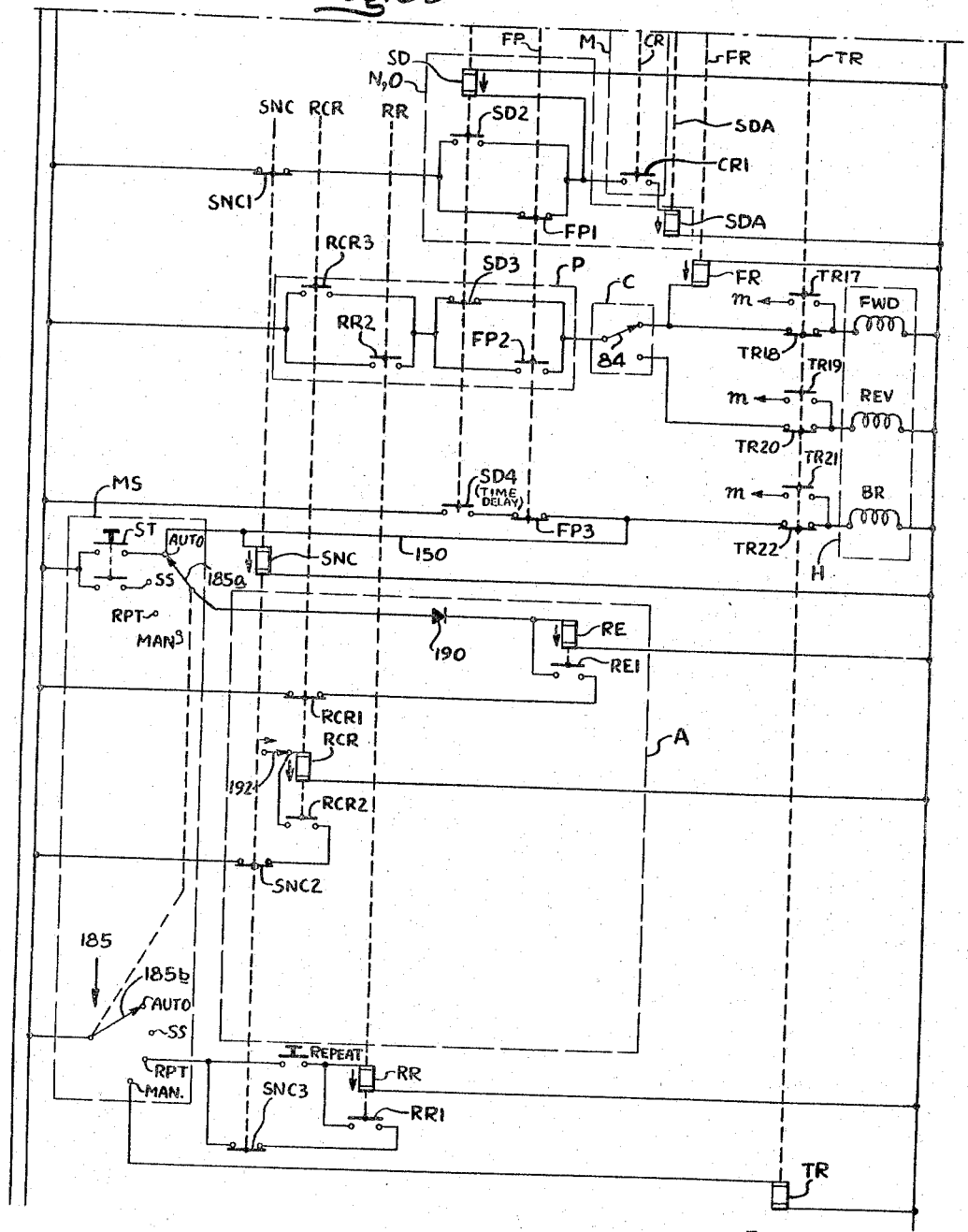

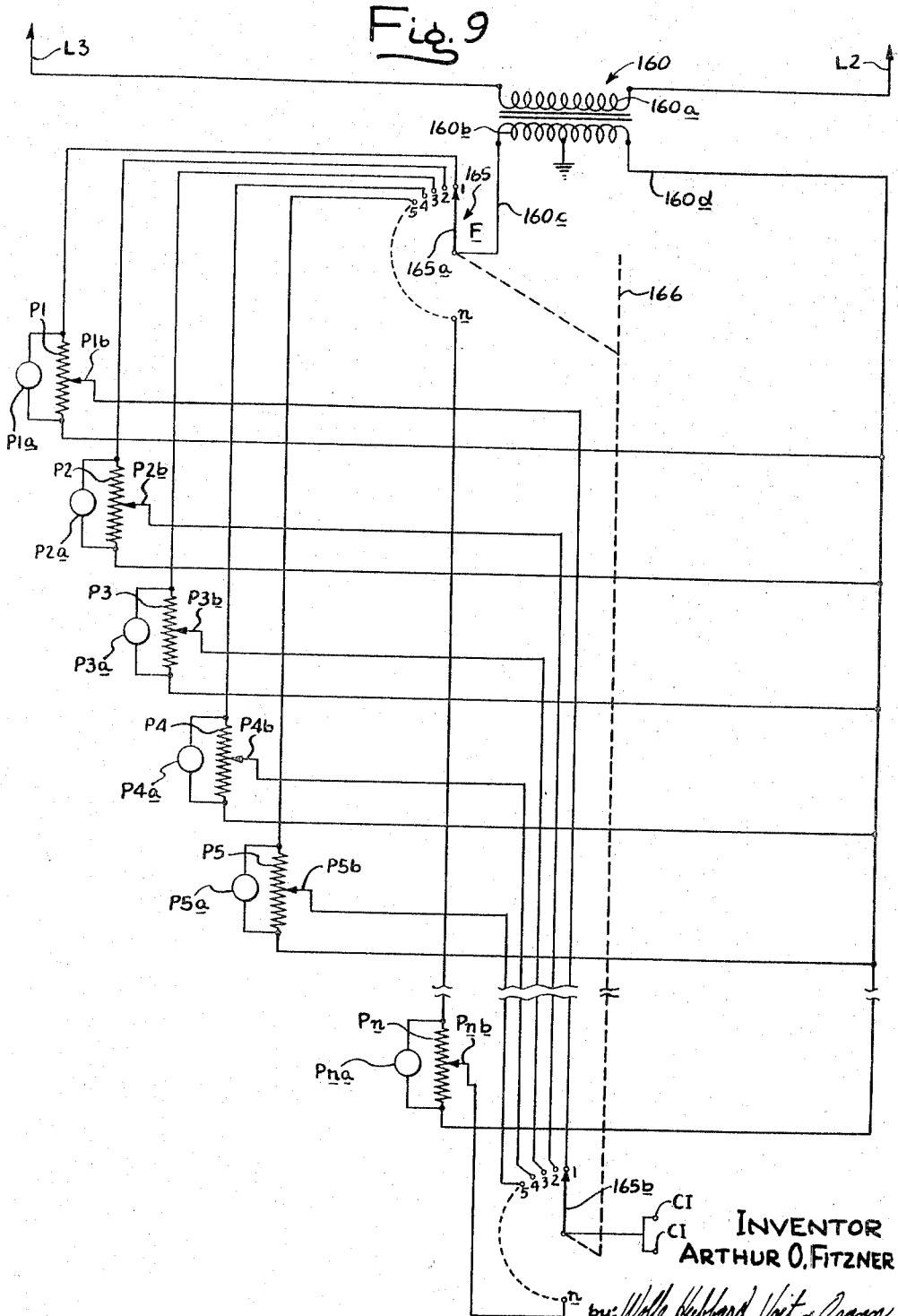

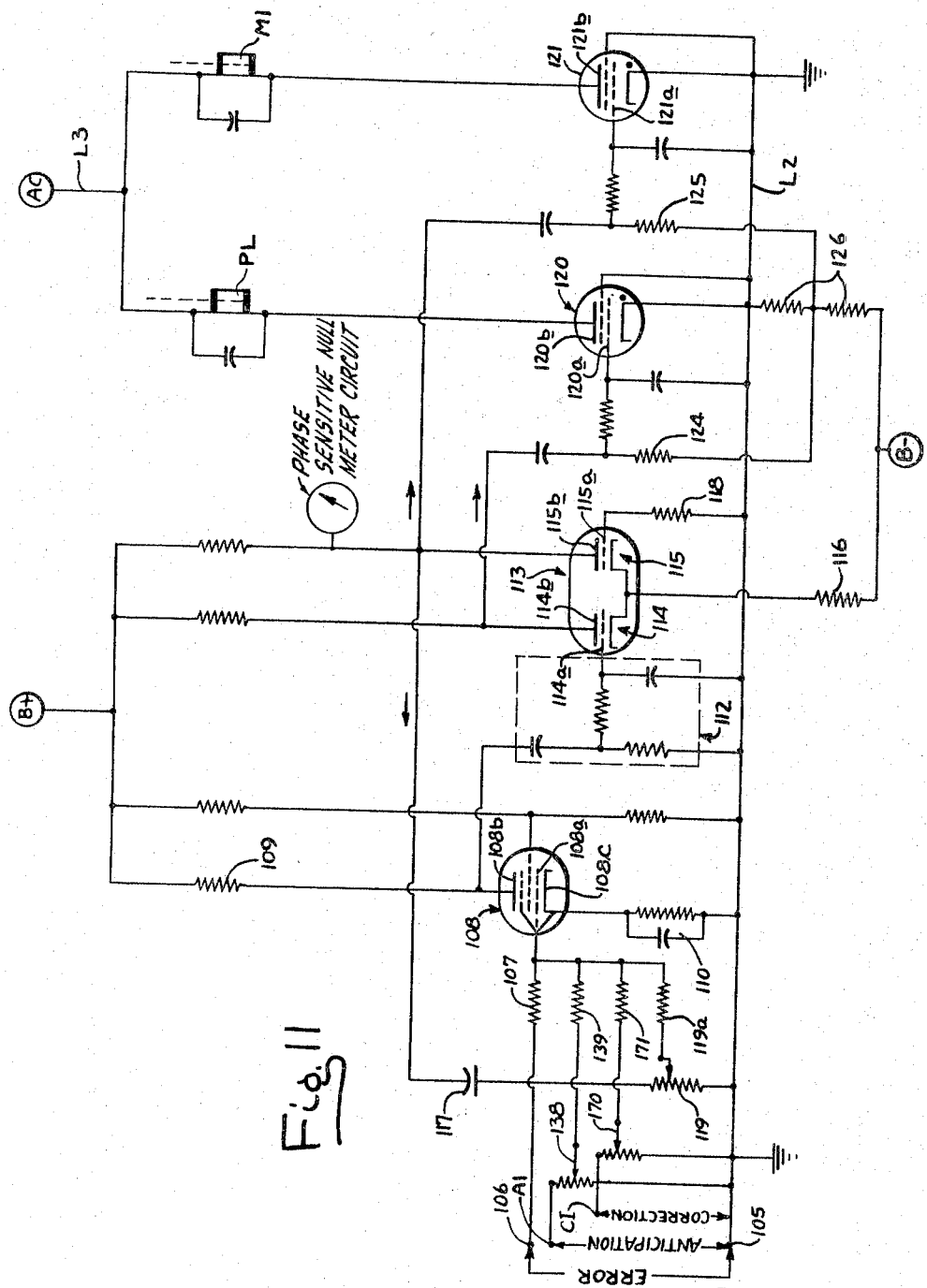

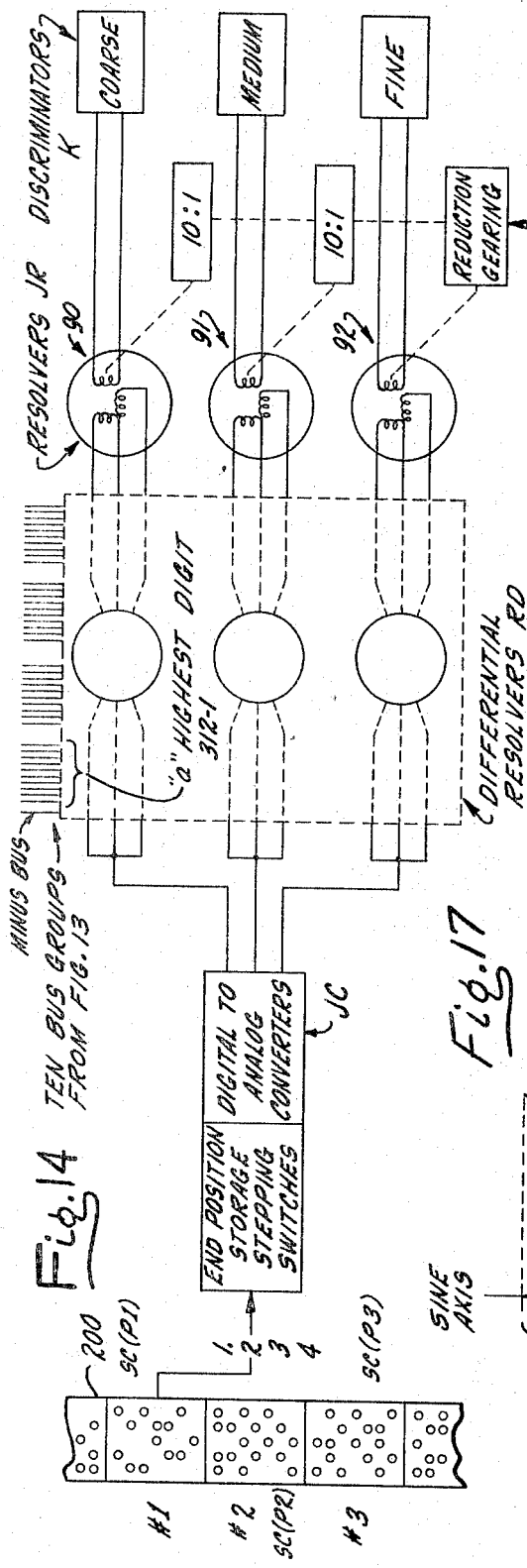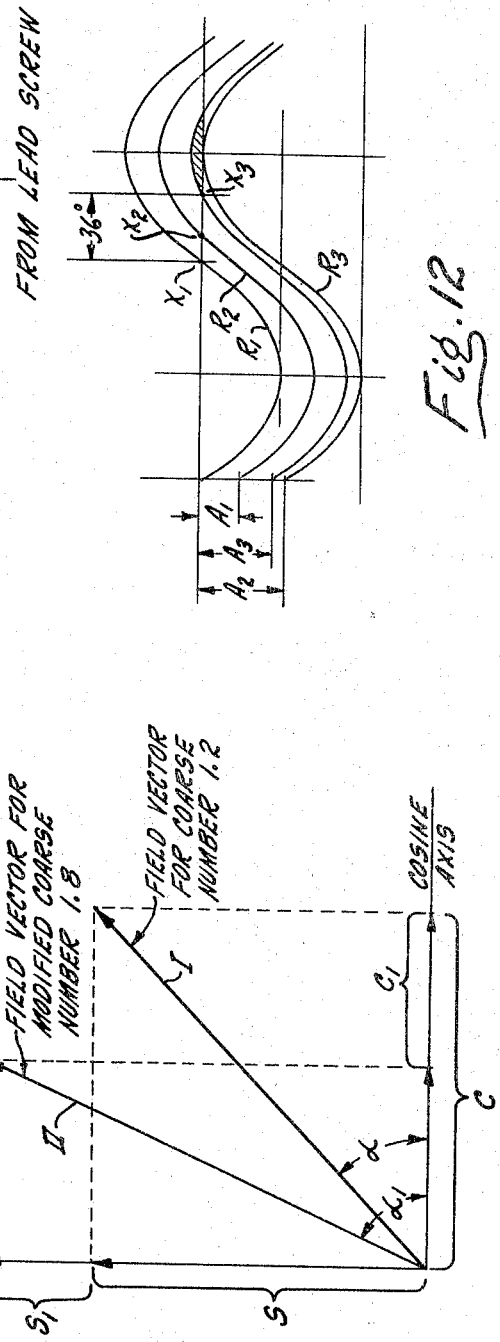

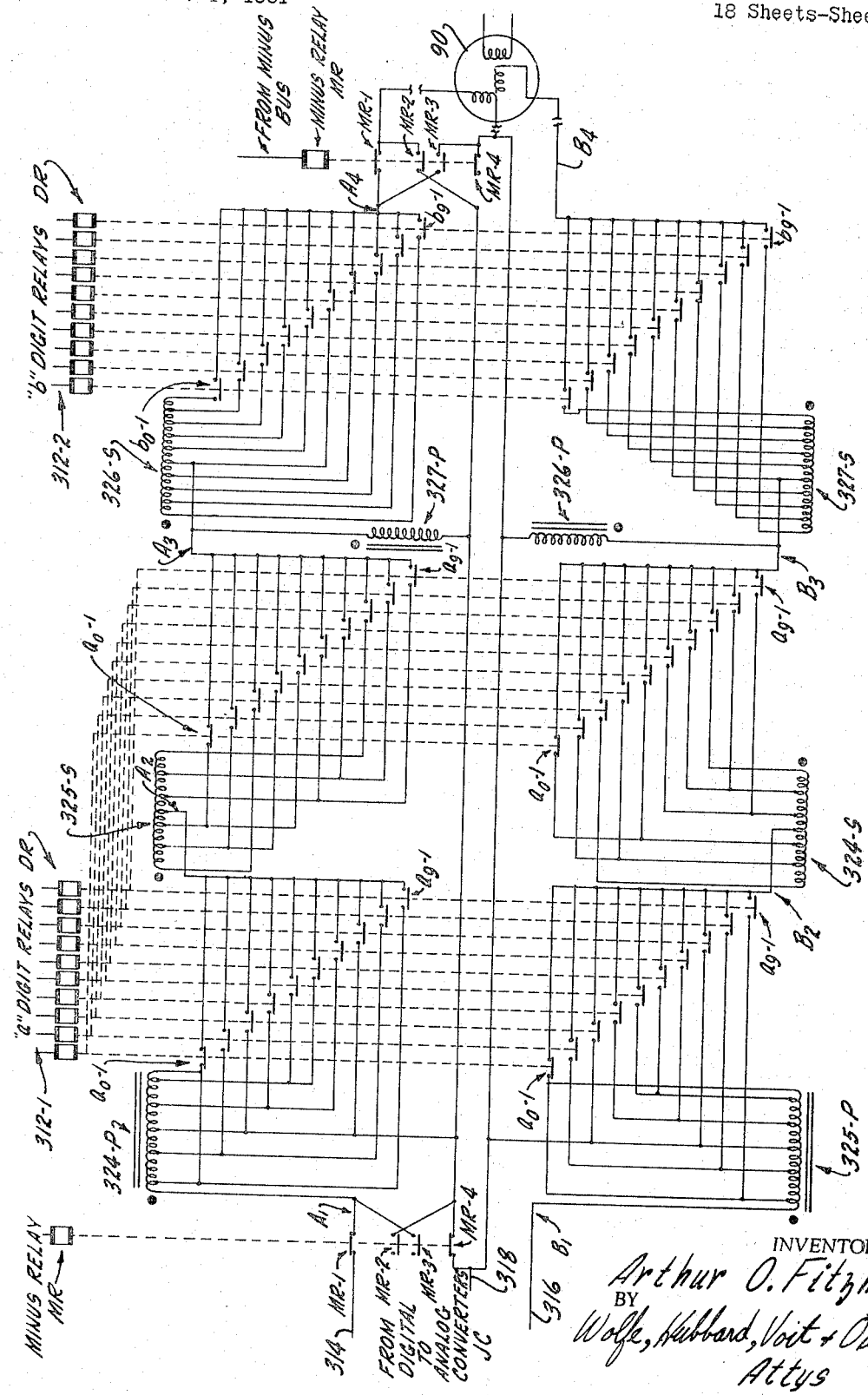

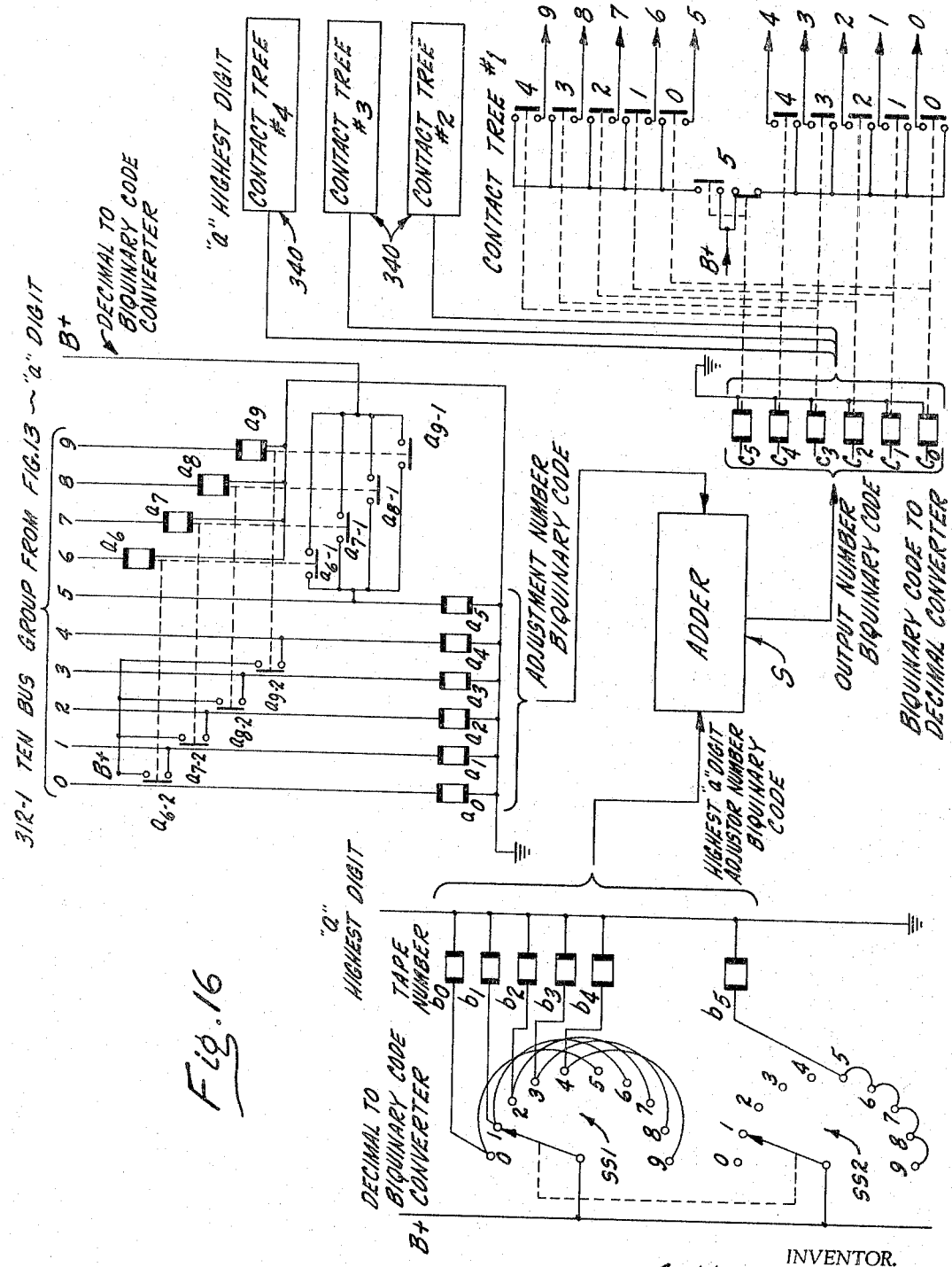

May 9, 1967
A. O. FITZNER
3,318,195
CONTROLS FOR MACHINE TOOLS AND THE LIKE
Filed Oct. 4, 1961
18 Sheets-Sheet 18
*Fig. 18*
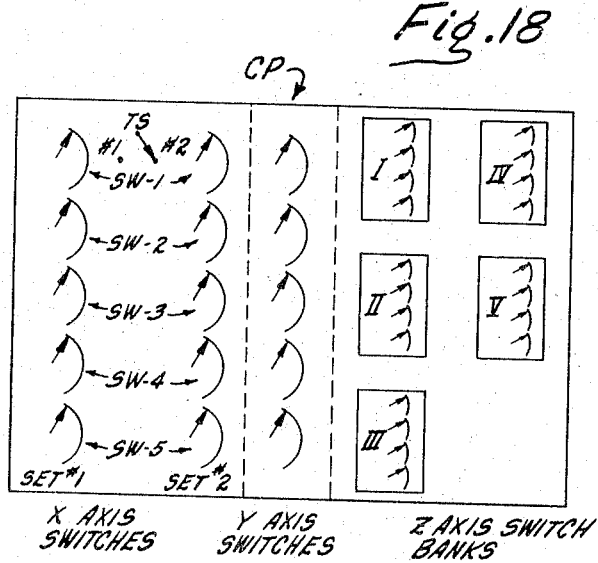
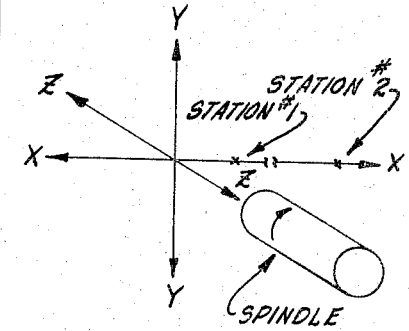
INVENTOR.
Arthur O. Fitzner
BY
Wolfe, Hubbard, Voit & Osann
Attys.

United States Patent Office 3,318,195
Patented May 9, 1967

3,318,195
CONTROLS FOR MACHINE TOOLS AND
THE LIKE
Arthur O. Fitzner, Fond du Lac, Wis., assignor to Giddings & Lewis Machine Tool Company, Fond du Lac, Wis., a corporation of Wisconsin
Filed Oct. 4, 1961, Ser. No. 142,964
31 Claims. (Cl. 90—13)

This application is a continuation-in-part of my application Ser. No. 763,057, filed Sept. 24, 1958, now Patent No. 3,016,778.

This invention relates in general to systems for controlling machine tools, and relates more particularly to improvements in systems for causing machine tools to execute automatically repetitive cycles of machining operations made up of a plurality of successive machining steps.

It is the general aim of the invention to enhance the flexibility, accuracy and convenience with which machining operations may be accomplished by automatically controlled machine tools, especially, although not exclusively, numerically controlled machine tools which are caused to carry out repetitively machining steps in the production of parts.

An important objective of the invention is to make possible adjustments, corrections or modifications at the machine tool of programmed position data stored on a record. More particularly, it is an objective of this invention to provide for small adjustments or corrections at the machine tool of programmed end position data to account for small errors such as measurement errors, tool deflection under load, and other variable conditions peculiar to individual machine tools which cannot be taken into account in programming.

A further objective is to provide for wide range adjustment or modification at the machine tool of programmed end position data so as to provide a simple means to align the programmed data frame of reference for particular tooling with the actual workpiece frame of reference, to account for workpiece positioning, multiple workpiece setups, tool positioning, tool length or tool standout and other variable conditions which are not easily taken into account by the programmer in setting up the program for the production of parts.

A related object is to provide an arrangement in which such corrections, when once made for different machining steps, will be repeated as the complete cycle of machine operation is executed a number of times, thereby avoiding the need for re-programming and making feasible the use of the same programmed information or data on different individual machine tools.

Another related object is to enable modification or corrective adjustments to be "dialed in" to a previously established program of machining steps at any time, whether during an initial run or during later runs.

It is another object of the invention to provide for such modification or corrective adjustment of end position data to be made in either direction along a plurality of axes, and accomplished by relatively simple apparatus.

An additional object is to make it possible for any machining program to proceed automatically from step to step, to be stopped after each step, to repeat the immediately preceding step, or to be interrupted and the machine converted to manual control. This flexibility enables the operator to measure the dimension of a workpiece resulting from an end point position of a tool carrying element, to back the tool away from the work, to make the necessary corrective adjustment, and to repeat the step in order to check the accuracy of positioning with the corrective adjustment taken into account.

Other objects and advantages will become apparent as the following description proceeds, taken in conjunction with the accompanying drawings, in which:

FIG. 2 is a diagrammatic illustration of an exemplary multi-speed transmission for driving the rotatable machine tool table;

FIG. 3 is a diagrammatic illustration of an exemplary multi-speed transmission for translating the saddle of the machine tool at different feed rates;

FIG. 4 is a block-and-line diagram of a control system embodying the features of the invention;

FIG. 5 is a simplified diagrammatic illustration of the system components in one embodiment of the invention, which cooperate to provide individual means at the machine tool for "dialing in" small corrective adjustments of programmed end point or stopping position data for each critical step of an overall machining program and in which a different adjustment means is selected for each such critical step so that the same adjustment will be automatically included for the corresponding step each repeated machining cycle;

FIG. 6 is a simplified, diagrammatic illustration of the system components in another embodiment of the invention, which cooperate to provide means at the machine tool for "dialing in" both small corrective adjustments of programmed data for each individual machining step and wide range adjustments applicable to a series of steps, and especially illustrating the differential resolver method for wide range adjustments of end point or stopping position data.

Figure 13:
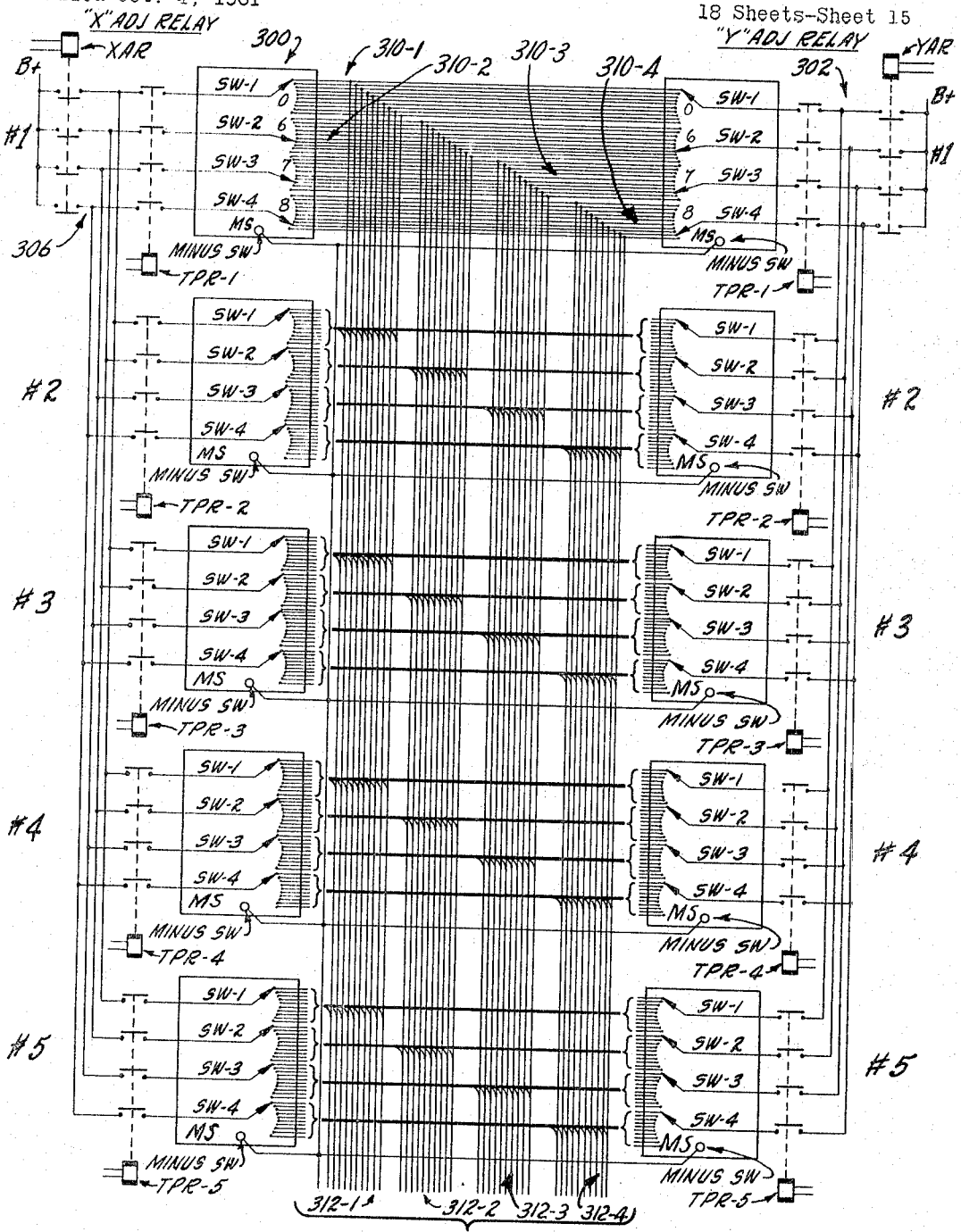

FIG. 7 is a simplified, diagrammatic illustration of the system components in another embodiment of the invention, which cooperate to provide wide-range adjustments of programmed end point position or stopping data, especially illustrating the digital summing method for wide range adjustments;

FIGS. 8A, 8B, 8C and 8D, when joined along the indicated junction lines are a schematic wiring diagram of portions of the system represented in FIG. 4;

FIG. 9 is a schematic wiring diagram of one embodiment of position adjustors and selectors;

FIG. 10 is a diagrammatic illustration of portions of servo controls for moving an element to predetermined positions, especially illustrating the relationship of resolvers and discriminators;

FIG. 11 is a schematic wiring diagram of one of the discriminators, including signal combining means;

FIG. 12 is a diagram for illustrating an algebraic summing of a resolver error signal and adjustor correction signal;

FIG. 13 is a schematic wiring diagram of one embodiment of wide range adjustors;

FIG. 14 is a diagrammatic illustration of portions of servo controls for moving an element to predetermined positions, especially illustrating the differential resolver method for wide range adjustment;

FIG. 15 is a schematic wiring diagram of a circuit simulating a differential resolver;

FIG. 16 is a schematic wiring diagram of networks for decimal to biquinary code conversion and for biquinary code to decimal conversion;

FIG. 17 is a vector diagram illustrating digital-to-analog converter derived sine and cosine voltages; and FIG. 18 is a diagrammatic illustration of adjustment means for dialing in origin adjustments along the X axis, wide range adjustments along the Y axis and tool adjustments along the Z axis, where the X, Y and Z axes are shown as conventionally associated with a horizontal spindle machine tool.

While the invention has been shown and will be described in some detail with reference to a particular embodiment thereof, there is no intention that it thus be limited to such detail. On the contrary, it is intended here to cover all alternatives, modifications and equivalents falling within the spirit and scope of the invention as defined by the appended claims.

THE ENVIRONMENT OF THE INVENTION

In order that the invention and its advantages may be fully understood, the background setting or environment for one specific application of the invention will first be briefly considered, particularly with reference to an exemplary machine tool. It will be understood, however, that the invention may be applied in a straightforward manner in other specific environmental settings and with types of machine tools other than the one here shown.

Exemplary machine tool

The machine tool here shown by way of example is a vertical turret lathe 20 (FIGURE 1) which, in general terms, includes a rotatable member or table 21 journaled for rotation about a vertical axis in a base 22 and adapted by means such as chuck jaws 23 to rigidly support a workpiece (not shown). Rising above the table 21 are columns 24 connected at their upper ends by a crosspiece 25 and supporting a vertically adjustable crossrail 26. The rail is formed with way surfaces 28 which slidably support a translatable element or saddle 30 for movement in a horizontal direction. The saddle, in turn, slidably supports a vertically movable ram 31 which carries an angularly positionable turret 32 adapted to carry a plurality of cutter tools selectively positionable in the downwardly extending, working position. As here shown, a tool holder 34 carried by the turret 32 is adapted to receive a cutter (not shown) which can machine the workpiece on the rotating table 21 to different diameters and accomplish facing cuts along surfaces disposed radially of the table axis.

The ram 31 is vertically positionable within the saddle by rotation of a lead screw 35, while the saddle 30 is horizontally positionable in response to rotation of an associated lead screw 36. The lead screw 36 is adapted to be driven in either direction and at any of a plurality of angular velocities in order to impart different feed rates or linear velocities to the saddle 30. For this purpose, a multi-speed feed transmission is disposed with a housing 38. Appropriate position indicators and manual control instrumentalities are disposed on the front face of the housing 38.

For further details regarding the organization and operation of the turret lathe 20, reference may be had to Hollis Patent No. 2,831,361, issued Apr. 22, 1958; and to the copending application of John C. Hollis, Ser. No. 525,469, filed Aug. 1, 1955, and assigned to the assignee of the present application. While the features of the present invention may be applied to the control of motions and positions of several other movable elements such as the ram 31, they will, for brevity, be described here only in relation to the feeding and positioning of the saddle 30 in coordination with rotation of table 21.

Table speed transmission

The rotatable member or table 21 (FIGURE 1) is adapted to be driven at any one of a plurality of rotational speeds. In order to understand how this is accomplished by electrical controls, a multi-speed table transmission having a plurality of electromagnetically operated clutches is illustrated in FIG. 2. As there shown, a prime mover or electric motor 40 has its output shaft 41 drivingly connected to a shaft 42 with either of two drive ratios in response to energization or deenergization of a speed clutch coil SC1. Energization of that coil shifts an armature 44 against the bias of a spring 45 and causes driving engagement of a clutch member 46 splined to the shaft 41 with a gear 48 journaled on that shaft. When the clutch coil SC1 is deenergized the spring 45 holds the clutch member 46 in driving engagement with a second gear 49 journaled on the shaft 41. The gears 48 and 49 are respectively meshed with gears 50 and 51 fast on the shaft 42, so that the latter will be driven from the motor shaft 41 at either of two speeds, depending upon whether the clutch coil SC1 is deenergized or energized.

In a similar manner, a clutch assembly 52 controlled by a clutch coil SC2 is interposed between the shaft 42 and a third shaft 53, so that the latter may be driven at any of four speeds depending upon the particular combination of the clutch coils SC1, SC2, which are energized. Further, the shaft 53 is drivingly connected to a fourth shaft 54 through a similar clutch assembly 55 controlled by a clutch coil SC3. Finally, the shaft 54 is drivingly connected to a final output shaft 56 through a clutch assembly 58 controlled by an associated clutch coil SC4 so that for each speed of the shaft 54 the shaft 56 may be driven at either of two speeds, depending upon whether the clutch coil SC4 is energized or deenergized. The output shaft 56 carries a pinion 59 meshed with a beveled ring gear 60 rigid with the table 21.

It will be apparent that depending upon the particular one of sixteen possible combinations of the four clutch coils SC1–4 which are energized, the table 21 may be driven at any one of sixteen possible rotational speeds. For convenience, these speeds are numbered and their exemplary values indicated opposite the corresponding combinations of the four clutch coils which are energized to produce those speeds in the following table:

TABLE I

| Speed No. | Table Speed (rev./min.) | Energized Clutch Coils ||||
|---|---|---|---|---|---|
|  |  | SC1 | SC2 | SC3 | SC4 |
| 1 | 24 |  |  |  |  |
| 2 | 28 | x |  |  |  |
| 3 | 34 |  | x |  |  |
| 4 | 40 | x | x |  |  |
| 5 | 48 |  |  | x |  |
| 6 | 56 | x |  | x |  |
| 7 | 68 |  | x | x |  |
| 8 | 80 | x | x | x |  |
| 9 | 96 |  |  |  | x |
| 10 | 112 | x |  |  | x |
| 11 | 136 |  | x |  | x |
| 12 | 160 | x | x |  | x |
| 13 | 192 |  |  | x | x |
| 14 | 224 | x |  | x | x |
| 15 | 272 |  | x | x | x |
| 16 | 320 | x | x | x | x |

The multi-speed table transmission of FIG. 2 is only diagrammatically illustrated, and a more detailed, preferred organization is shown and described in the above-identified copending Hollis application.

Saddle feed transmission

The multi-speed feed transmission for translating the saddle 30 in either direction and at any of a plurality of relative feed rates may be of the type disclosed and claimed in the above-identified Hollis patent. To facilitate an understanding of the present invention, such feed transmission is diagrammatically illustrated in FIG. 3, having an input member in the form of a gear 61 which is meshed with and driven from a gear 62 (FIG. 2) which rotates in timed relation to the table 21. Therefore, the input to the feed transmission is always at a speed which is related to the table speed. Drivingly connected between the input gear 61 and a shaft 63 are four two-speed gearing and clutching assemblies 64, 65, 66, 67 respectively controlled by four feed clutch coils FC1, FC2, FC3 and FC4. The gearing and clutching assemblies 64–67 are here shown as identical to such assemblies appearing in FIG. 2, and therefore need not be described in detail. It is sufficient to note only that, for a given speed of the input gear 61 (i.e., a given speed of the table 21), the final shaft 63 may be driven at any of sixteen possible speeds or rates, depending upon the particular combination of the four clutch coils FC1–4 which are energized.

In order to control starting and stopping of the saddle 30, and the direction of its movement, the shaft 63 is drivingly connected through two normally disengaged forward and reverse clutches 68, 69 to the lead screw 36 which is threadably engaged with a nut 30a connected to the saddle. Energization of a forward clutch coil FWD shifts a clutch member 68a splined to the screw 36 into engagement with a gear 68b journaled on that screw and meshed with a gear 63a fixed to the shaft 63. This will drive the lead screw 36 in a rotational direction which makes the saddle 30 move in a forward direction, i.e., from right to left in FIGURE 1. Alternatively, energization of a clutch coil REV will shift a clutching member 69a splined to the lead screw 36 into engagement with a gear 69b journaled on that screw and coupled through an idler gear 70 to a gear 63b rigid with the shaft 63. This will cause the lead screw 36 to rotate in such a direction as to move the saddle 30 reversely, i.e., from left to right. When neither of the clutch coils FWD or REV is energized, then the saddle 30 will be stopped, even though the table 21 is turning.

Also associated with the lead screw 36 is a normally released brake 71 which is engaged upon energization of an associated brake coil BR. Engagement of the brake 71, after disengagement of both clutches 68 and 69, brings the saddle to an abrupt stop without coasting.

In order that exemplary values of the sixteen possible relative feed rates of the saddle will be readily apparent, together with the particular combinations of the four feed clutch coils FC1–4 which must be energized in order to produce each such relative feed rate, these are tabulated in the following table:

TABLE II

| Feed No. | Feed Rate (in./rev.) | Energized Clutch Coils | | | |
|---|---|---|---|---|---|
| | | FC1 | FC2 | FC3 | FC4 |
| 1 | .0007 | | | | |
| 2 | .0011 | x | | | |
| 3 | .0015 | | x | | |
| 4 | .002 | x | x | | |
| 5 | .003 | | | x | |
| 6 | .004 | x | | x | |
| 7 | .006 | | x | x | |
| 8 | .009 | x | x | x | |
| 9 | .012 | | | | x |
| 10 | .018 | x | | | x |
| 11 | .024 | | x | | x |
| 12 | .036 | x | x | | x |
| 13 | .048 | | | x | x |
| 14 | .072 | x | | x | x |
| 15 | .096 | | x | x | x |
| 16 | .144 | x | x | x | x |

It is to be noted that the feed rates tabulated in the foregoing table are relative feed rates expressed in "inches per table revolution," in view of the fact that the speed of the input gear 61 depends on the speed of the table 21. The absolute feed rate or velocity in "inches per minute" at which the saddle 30 moves depends upon both the setting of the speed transmission (FIG. 2) and the setting of the feed transmission (FIG. 3).

THE CONTROL SYSTEM IN GENERAL

The system as diagrammatically illustrated in FIG. 4 comprises a data input device or reader A which is adapted to supply successive sets of information which will govern the operation of the machine tool during succeeding steps of an over-all machining operation. The reader A may, for example, be a punched tape reader which accepts a punched tape having rows of holes therein digitally representing symbols or numerals for the various adjustable conditions which may change from step to step in an over-all machining operation.

Each "block" of data for controlling each step of machining includes information as to the speed at which the machine table 21 is to be driven. Such information will be supplied to a table speed storage means B which, in turn, controls the energization of the clutches in the table speed transmission G (shown in detail by FIG. 2). Each such block of data further includes indicia or information designating the direction in which the translatable element or saddle 30 is to be moved by means herein shown as the saddle lead screw 36 in order to move a cutter carried by the turret 32 (FIGURE 1) to a desired end point position. Such direction information is supplied from the reader A to direction storage means C which, in turn, works through a stop control P to properly energize the machine direction clutches H (i.e., clutches FWD and REV of FIG. 3).

Further, each block of data includes information transferred from the reader A to a feed rate storage D in order to determine the running feed rate at which the saddle 30 (FIGURE 1) moves toward the desired end point position. The feed rate storage D works through a comparator-selector M to properly energize the clutches in the machine feed transmission I (such as that detailed in FIG. 3). Moreover, each block of input data includes numerical information defining the end point position to which the saddle 30 and the cutting tool movable therewith are to be translated to carry out one machining step. This position data is transferred from the reader A to an end position storage E which supplies that information to digital-to-analog converters L and resolvers J forming part of a positioning servo system and which produce error signals applied to discriminators K.

Finally, each block of data read by the reader A may contain information which selects a particular adjustor or correcting device, and such information is transferred from the reader A to storage means F which connects a certain one of adjustors Q in controlling relationship to the information channel between the reader A and the discriminators K.

FIG. 4 indicates functionally that as each block of information relating to each successive step of machining operation is supplied to the system, table speed storage means B, direction storage means C, feed rate storage means D, end point position storage means E, and selected adjustor storage means F are all set to the proper conditions to represent that block of input information.

The components E, J, K, L operate to produce an error signal whenever there is a discrepancy between the end point position represented by the data stored in the storage means E and the actual position of the translatable element being controlled, i.e., the saddle 30. Such an error signal appearing after a block of information has been read is utilized to cause movement of the saddle in a direction determined by the status of the machine direction clutches H and at a relative running feed rate determined by the status of the machine feed transmission I, while the machine table 21 is driven at a rotational speed determined by the status of the machine table transmission G. These latter components G, H and I are set in accordance with the data stored by the storage devices B, C and D.

In accordance with certain features of the machine tool control herein described, which are more fully described in the parent application, now Patent No. 3,016,778, of which the present application is a continuation-in-part, provision is made to cause the machine tool element to slow down before it reaches the final or end point position and preferably to slow down when it reaches a point displaced from the end point by a distance which is proportional to the absolute feed rate or velocity of the saddle 30. This initiation of slow down at an anticipation point dependent upon the running velocity improves the accuracy of stopping at the end point position by avoiding overshoot. It is accomplished in general, through the provision of an anticipation computer (not shown) which senses (a) the speed at which the table is rotating from the table speed storage B, and (b) the relative running feed rate at which the saddle is moving from the feed rate storage D. The output of the anticipation computer is an anticipation signal which is algebraically combined with the error signal in the discriminators K so that the latter activate a slowdown device at the instant when the change-over to a fine feed rate should take place.

As a further feature of the present control system, provision is made to prevent the saddle 30 from being reduced to its fine feed rate if the running feed rate is less than the fine feed rate which would otherwise occur. For this purpose a fine feed computer (not shown) is employed to determine the value of a relative fine feed rate which at the selected table speed will result in an absolute fine feed rate which is of a substantially uniform value regardless of the table speed. The fine feed computer senses the existing table speed from the table speed storage B, and provides an output response which designates the relative fine feed necessary to produce the desired absolute fine feed value. This relative fine feed signal or indication produced by the fine feed computer is compared with the existing running feed rate represented by the condition of the feed rate storage D. Only if the running feed rate is greater than the computed fine feed rate will signals pass to the machine feed transmission I to produce the desired fine feed rate.

When the translatable element or saddle 30 has reached the desired end point position represented by data stored at E, the discriminators K supply a signal to a stop means O, which, in turn, activate the stop control P so that the machine direction clutches H are conditioned to terminate the saddle movement. The stop response provided at O is also fed back to the data input reader A which causes the latter to read off the next block of information and to supply appropriate information to the several storage means.

The organization and operation of the selected adjustor storage F and the adjustors Q, in providing for adjustment or modification of the programmed end position data will be taken up in greater detail hereafter.

*Table speed storage and control*

FIGS. 8A, 8B, 8C and 8D illustrate in more detail the various components of apparatus represented in block form by FIG. 4. The table speed storage B may, in one form, be constituted by multi-position switch 80 having a plurality of banks of stationary contacts selectively engageable by rotatable wipers 80a–j. These wipers are all connected to a common shaft 81, schematically represented by a dashed line, adapted by any of a variety of means well known in the art to be set to any one of the sixteen positions corresponding to a particular table speed designated by the input data received from the reader A. For example, the switch 80 may be a stepping switch of well known construction which is so arranged as to be stepped to any of the angular positions 1 through 16 whenever table speeds 1 through 16 (Table I) are designated by the input information. Alternatively, the shaft 81 and the wipers connected therewith may be manually set to any of the sixteen possible positions.

The four switch wipers 80a, 80b, 80c, and 80d (FIG. 8A) are selectively connected across D.C. voltage supply lines L1, L2 through their associated stationary contacts and respective ones of the speed clutch coils SC1, SC2, SC3, and SC4. These connections are made through normally closed transfer relay contacts TR2, TR4, TR6 and TR8, respectively. The connections between the voltage supply line L1 and the sixteen stationary contacts associated with the wipers 80a–d are so correlated that as those wipers move through their sixteen possible positions the speed clutch coils SC1–4 will be energized in the combinations designated by Table I to produce the sixteen possible table speeds. Thus, the angular setting of the switch shaft 81 and the associated wipers constitutes a storage of the desired table speed and also effects energization by the clutch coils SC1–4 within the speed transmission in order to set the latter to produce the particular table speed represented by the angular position of the shaft 81.

*Direction storage and control*

The direction storage C (FIG. 4) may be here constituted by a two-position switch 84 (FIG. 8D) which is adapted to be set to one position or the other, according to whether the input data from the reader A designates that the saddle is to be moved in a forward or a reverse direction. The switch 84 by the position of its movable arm to an upper or lower stationary contact, stores and represents the desired direction of saddle movement, constituting a part of an energization circuit for the forward clutch coil FWD when in the upper position and constituting a part of an energization circuit for the reverse clutch REV when in the lower position. Thus, assuming that the stop control P calls for motion of the saddle 30, the direction storage switch 84 will result in energization of the appropriate direction clutch coil to produce movement in the desired direction. This operation will be treated in more detail below.

*Feed rate storage and control*

Figure 8A:
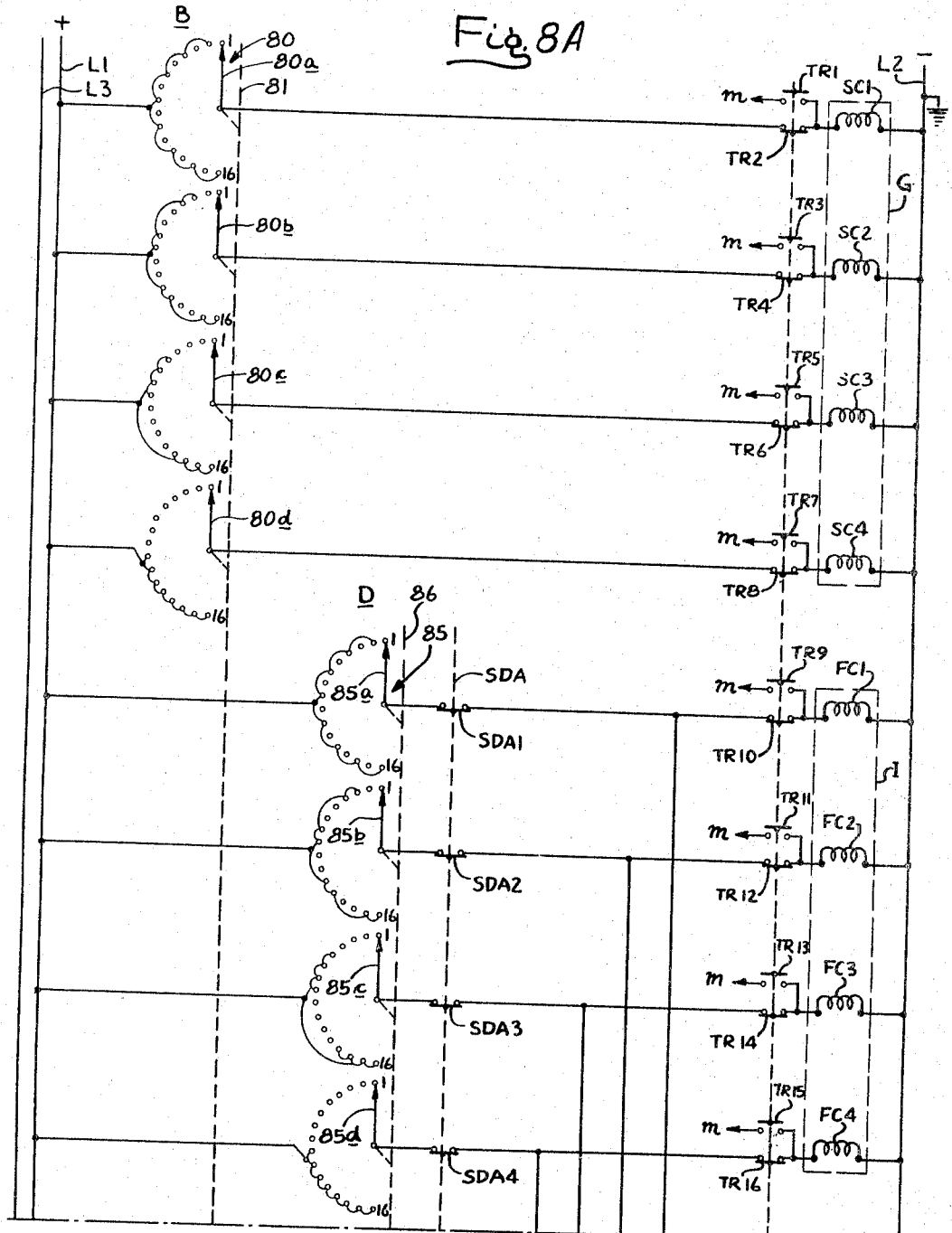
Figure 8B:
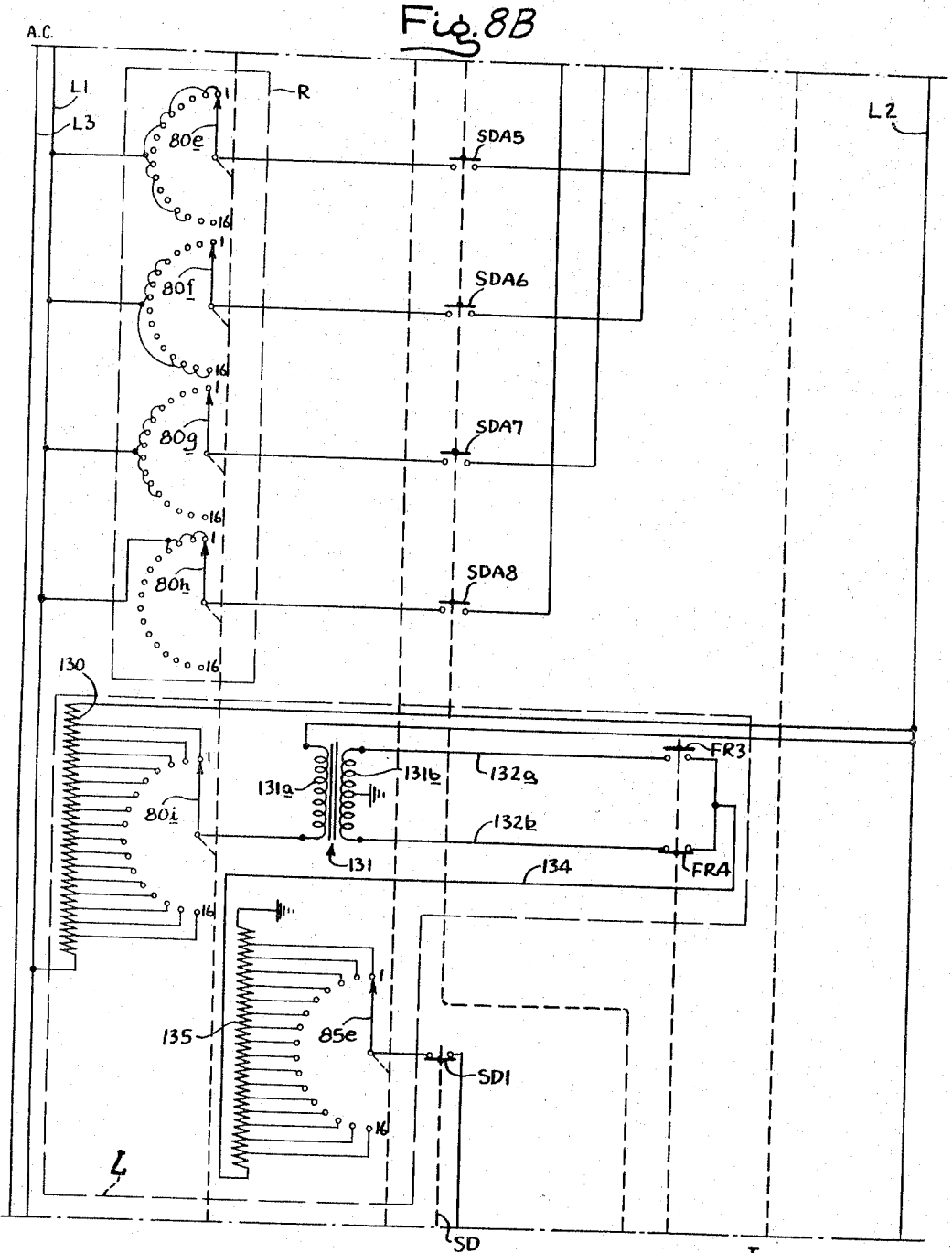

The feed rate storage D (FIG. 4) may, in one form shown by FIGS. 8A–C, be a multi-position switch 85 having a plurality of rotatable contact wipers 85a–f connected to a common shaft 86 and selectively engageable with any of sixteen stationary contacts associated with each. The shaft 86, in a manner similar to the shaft 81, is set to a particular one of its sixteen possible angular positions by feed rate information received from the data input reader A (FIG. 4), and thus by its angular position during any particular machining step, stores the relative feed rate at which the saddle 30 will be translated.

In order to control the four clutches in the feed rate transmission of FIG. 3 so as to produce the particular feed rate designated by the angular position of the shaft 86, the switch wipers 85a–d are respectively connected across the D.C. voltage supply lines L1, L2 through their stationary contacts, through normally closed contacts SDA1–4, and through normally closed contacts TR10, TR12, TR14 and TR16 in series with the feed clutch coils FC1, FC2, FC3 and FC4, respectively. A particular combination of the stationary contacts associated with each of the switch wipers 85a–d is connected to the positive voltage supply line L1 such that the feed clutch coils FC1–4 will be energized in the sixteen possible combinations shown by Table II, supra, as the shaft 86 and the wipers are moved to their sixteen successive positions. It will be evident from an inspection of the connections to these stationary contacts that the feed clutch coils FC1–FC4 will, under normal circumstances, be energized in the proper combinations to produce any desired relative feed which may be represented by the angular position of the switch shaft 86.

*End-position storage and control*

The end position storage E and the associated converters L and resolvers J together with the discriminators K may take the detailed form which is more fully disclosed and claimed in my copending application Ser. No. 763,103, filed Sept. 24, 1958, and assigned to the assignee of the present application. Those components have been shown in diagrammatic form by FIG. 10, where the position storage E is labeled as constituted by a plurality of stepping switches which are set in accordance with end position information to angular positions numerically and digitally representing the desired end position. Such stepping switches control digital-to-analog converters L1 which, in turn, produce analog excitation signals for stator windings 90a, 91a, 92a of coarse, medium and fine resolvers 90, 91, and 92. These three resolvers have rotor windings 90b, 91b, 92b, which are electrically connected to coarse, medium and fine discriminators 94, 95 and 96.

The rotors which carry windings 90b, 91b, 92b are mechanically connected to be driven in timed relation to the movement of the translatable element or saddle 30 (FIGS. 3 and 10) through successive sets of reduction gears 98, 99 and 100, the gear ratios being chosen preferably such that the rotor of the coarse resolver 90 turns at a rate of one revolution per 10 inches of saddle movement, the rotor of the medium resolver 91 turns at a rate of one revolution per inch of saddle movement, and the rotor for the fine resolver 92 turns at a rate of one revolution for 0.1 inch of saddle movement. In actual practice, a greater number of successively driven resolvers might be employed to produce a wider range of controlled movement for the saddle, but the present illustration of three resolvers will illustrate the basic organization and operation of the positioning apparatus.

Briefly stated, the digital-to-analog converters L1 function to excite the resolvers 90–92 in order to produce magnetic fields therein which will induce A.C. error signals in the respective rotor windings 90b–92b which are proportional in magnitude to the sine of, and agreeable in phase polarity with, the angular displacement of the rotors from a unique angular position defined by the numerical information digitally represented by the stepping switches E. By way of example, if a particular end point position of 2.345 inches (measured from a suitable reference point along the path of travel of the saddle 30) is stored in the stepping switches E, then the coarse resolver 90 will be excited so that its rotor winding 90b will produce an error signal until that rotor winding has been physically driven at an angle which signifies that the saddle 30 has reached a position corresponding substantially to 2.3 inches. Similarly, the medium resolver 91 will be excited such that its rotor winding 91b will produce an error signal until that rotor winding has been angularly driven to a position which signifies that the saddle 30 has moved from the reference position 0.34 inch plus some integral multiple of one-half inch. Finally, the fine resolver 92 will be excited such that its rotor winding 92b will produce an error signal until it is moved to an angular position signifying that the saddle 30 has been moved 0.045 inch plus some integral multiple of 0.05 inch.

Unless the saddle 30 is at the end point position represented by information stored in the stepping switches E, therefore, the rotor winding 90b will produce an A.C. error voltage related in magnitude to the difference between the actual position of the saddle 30 and the stored information representing the end point position to the nearest tenth of an inch. Such voltage will be of a phase polarity which corresponds to the sense of such difference. The rotor winding 91b will produce an A.C. error voltage related in magnitude to and agreeable in phase polarity with the extent and sense of the difference between the actual position of the saddle 30 and the stored information representing the end point position to the nearest one-hundredth of an inch. Finally, the rotor winding 92b will have induced therein an A.C. error voltage which is related in magnitude to, and agreeable in phase polarity with, the extent and sense of the error between the saddle position and the stored information representing the end point position to the nearest thousandth of an inch.

Although the error signals induced in the medium and fine rotor windings 91b and 92b may pass through several zero or null values as the saddle is moved through a relatively great distance to reach a desired end point position, the movement of the saddle is not terminated because at those instants the coarse rotor winding 90b will not be producing a null or zero error response.

The three discriminators 94, 95 and 96, are substantially identical in organization, and FIG. 11 will serve to illustrate the construction and operation of all three. As shown in FIG. 11, each of the discriminators has input terminals 105, 106 adapted to receive the error signal produced by the associated resolver rotor winding. That signal is coupled through a resistor 107 to the control electrode 108a of a suitable amplifying discharge device or pentode vacuum tube 108. The anode 108b of the latter is connected to a positive D.C. voltage source (here represented by the symbol B+) through a load resistor 109, and its cathode 108c is connected directly through a self-biasing circuit 110 to a point of reference potential (here shown as ground) common to the input terminal 105.

The error signal appears in amplified form at the anode 108b and is coupled through a stabilization circuit 112 to a phase inverter 113. The phase inverter comprises two triode discharge devices 114, 115 having their cathodes connected through a common resistor 116 to a point of negative potential (here conventionally symbolized as B−). With the control electrode 115a of the triode 115 connected by a resistor 118 directly to ground, there is direct cathode coupling between the triodes 114 and 115. Therefore, as the amplified error signal is supplied to the control electrode 114a, it will appear at the anode 114b in phase with the signal applied to the terminals 105, 106 and will appear at the anode 115b with opposite phase (180° displaced) relative to signal at 105, 106.

To afford adjustment in the net gain of the pentode 108, to stabilize its operation, and to adapt it to work as a summing amplifier (for a purpose made clear below), an adjustable negative feedback circuit is employed. The signal appearing at the anode 115b is always 180° out-of-phase with the A.C. input signal at 106, 105. It is coupled back to the control electrode 108a through a capacitor 117 and a potentiometer 119 having a wiper leading through a resistor 119a to the grid 108a. Adjusting the wiper changes the effective amplitude of the feedback signal which always subtracts from the error input signal, thereby changing the gain or ratio between the amplitude of the input error signal and the amplified signals at the anodes 114b, 115b.

These phase-displaced signals appearing at the anodes 114b and 115b (A.C. voltages proportional in magnitude to the input error signal) are coupled to the control electrodes 120a, 121a of two thyratron type discharge tubes 120 and 121. The anodes 120b and 121b of the respective thyratrons are connected in series with relays PL and MI to one side of an A.C. voltage source (here represented by a supply line L3). Capacitors parallel with the relay coils insure that the relays will remain picked up when intermittent current pulses flow through such coils.

The control electrodes 120a, 121a are biased below cutoff by the connection through resistors 124, 125 to a negative biasing voltage divider 126. Thus, unless the A.C. signal voltage applied to the control electrodes 121a is (a) in phase with the A.C. voltage appearing on the line L3 and applied to the respective anodes 120b, 121b, and (b) of greater than predetermined amplitude, the thyratrons 120 and 121 cannot fire or conduct current during any portion of each cycle of the A.C. source voltage. Under these conditions, the relays PL and MI will both be deenergized.

Whenever the error signal applied to the input signals 105, 106 is greater than a predetermined magnitude, one of the thyratrons 120 or 121 will conduct current during a portion of each cycle of the alternating voltage appearing on the line L3, depending upon whether that error signal is of one phase or the other, i.e., whether the position error is of a positive or negative sense. Thus, as explained in applicant's above-identified copending application, one or the other of the relays PL or MI will be energized whenever a positive or negative position error greater than a predetermined value is produced by the associated resolver. That predetermined value, or the width of the "deadband," may be varied by adjusting the feedback potentiometer 119. Whenever the position error becomes less than such predetermined value, both of the relays PL and MI will be simultaneously deenergized, thereby signifying that the associated resolver has been physically driven from the lead screw of the saddle 30 to within a predetermined deadband of an absolute null position.

Referring now to FIG. 8C, the coarse, medium and fine discriminators 94, 95, 96 are there illustrated as having relay contacts which are controlled according to the energization of the relays PL and MI therein. These relay contacts are connected in circuit with the coil of a final position relay FP across the voltage supply lines L1 and L2. Assuming for the moment that the relay contacts FR1 and FR2 are in the positions illustrated, i.e., normally open and normally closed, if a negative error response is provided by the coarse discriminator 94 then the contacts MI1a will be closed and the contacts MI1b opened. Thus the relay FP will be energized and picked up by current flow through the contacts MI1a.

If after the coarse discriminator 94 is satisfied and both the relays PL and MI therein be deenergized, the relay FP will, nevertheless, be energized as long as the medium discriminator 95 provides a negative error response resulting in actuation of the contacts MI2a and MI2b. Current flows through the contacts MI2a and normally closed contacts PL1b to the relay coil FP. Closure of contacts PL3a or MI3 in the fine discriminator 96 can produce no change in this condition.

If, however, the medium discriminator 95 is then satisfied so that both of the relays therein are deenergized, the relay FP will remain picked up by current flow through the contacts MI3a, PL2b and PL1b so long as the fine discriminator senses a negative error. When the fine discriminator 96 is satisfied so that both the contacts PL3a and MI3a are opened, the relay FR will be deenergized, thereby signifying that the desired position has been reached by the movable element or saddle 30.

The above-described operation will be substantially the same if the relay contacts FR1 are closed and the contacts FR2 opened, and the three discriminators 94, 95 and 96 sense positive errors and are sequentially satisfied. The delay FP will remain energized so long as the coarse discriminator 94 provides a positive error response and regardless of conditions of the medium and fine discriminators 95 and 96. Once the coarse discriminator 94 is satisfied, the relay FP will remain energized so long as the medium discriminator 95 provides a positive error response, and regardless of the state of the fine discriminator 96. Finally, when both the coarse and medium discriminators 94, 95 are satisfied, the relay FP will remain energized until the fine discriminator 96 is satisfied, indicating that the saddle 30 is at the desired end point position, whereupon the relay FP will be deenergized.

In a manner to be described, this dropping out or deenergization of the relay FP is caused to deenergize the activated one of the forward or reverse clutch coils FWD or REV, so that drive from the feed transmission (FIG. 3) to the saddle lead screw is interrupted and the saddle brought to a halt. When this occurs, a signal is produced to cause a new block of controlling data to be inserted into the several storage means of FIG. 4 so that the cycle of operation for the next succeeding machining step is repeated.

SLOW DOWN ANTICIPATION COMPUTER AND CONTROLS

As previously noted, during each successive machining step, the table 21 may be made to rotate at any one of sixteen possible speeds. Moreover, the saddle 30 may be made to move toward the desired end point position for any step at any one of sixteen possible relative feed rates. These selected relative feed rates are here termed the "running" feed rates. Thus, the velocity of the saddle 30 and the components carried thereby may vary considerably.

In order to prevent overrunning of the saddle 30 beyond the desired end point position represented by the end point storage means and sensed by the discriminators 94, 95, 96, it is highly desirable to reduce the velocity of the saddle 30 as the latter closely approaches the end point position. Thus, release of the engaged direction clutch 68 or 69 (FIG. 3) and actuation of the brake 71 can bring the saddle to a halt without overshooting the end point position.

To improve this slowing down action, provision is here made to sense the velocity at which the saddle 30 is moving and to effect the slow down in its motion when the saddle is displaced from an end point position by a distance which is variable from step to step, and which is directly related to the velocity of the saddle. For this purpose, the anticipation computer L (FIG. 4) is made to produce an anticipation signal which represents the distance before each end point position at which the saddle should be slowed from the running feed rate to a fine feed rate.

The anticipation computer L is detailed in FIG. 8B. It receives as a first input an indication of the speed at which the table 21 is rotating, such indication being provided by the position of the movable wiper 80i connected to the shaft 81 of the table speed storage switch 80. This indication of the selected table speed is converted into an A.C. voltage which is directly related (and preferably proportional) to the speed at which the table is rotating, regardless of which one of the sixteen possible table speeds have been selected and effected by the setting of the switch 80. For this purpose, the sixteen stationary contacts engaged by the wiper 80i as the table speed is set to its sixteen respective speeds (Table I, supra) are connected to spaced taps on a voltage divider. The latter is here shown as a resistor 130 connected across an A.C. voltage source represented in FIG. 8B by an A.C. supply line L3 and the supply line L2 (at ground potential). As the switch 80 is moved to positions 1–16 corresponding to table speeds numbers 1–16 (Table I), a progressively increased A.C. voltage will appear on the wiper 80i relative to the supply line L2 (ground). This latter voltage is termed the "speed voltage" and is increased in amplitude as the table speed is increased from one setting to the next.

As shown in FIG. 8B, the wiper 80i leads through the primary winding 131a of a transformer 131 having a center tapped secondary winding 131b. There is thus induced on the output conductors 132a and 132b two A.C. voltages (measured relative to a ground) which are in amplitude directly related (and preferably, although not necessarily, proportional) to the rotational speed at which the table 21 is operating. Moreover, these voltages appearing on the conductors 132a and 132b are of relatively opposite phase polarity.

A particular one of the these two A.C. voltages is supplied to a common conductor 134 through one or the other of normally open contacts FR3 and normally closed contacts FR4, depending upon whether or not the relay FR is actuated. The relay FR (FIG. 8D) is a "forward" relay and is connected to be energized whenever the forward clutch coil FWD is energized to make the saddle move in a forward direction. Thus, if the saddle is moving in a forward or a reverse direction, the relay FR will be picked up or dropped out. In this manner, the speed voltage appearing upon the conductor 134 is made to be substantially proportional in amplitude to the speed at which the table is rotating in any machining step, and of a phase polarity which agrees with the sense or direction of saddle movement.

The absolute velocity of the saddle 30 depends not only upon the table speed, but also upon the selected relative feed rate. To take this into account, the anticipation computer receives as a second input an indication of the particular relative running feed which has been selected for any machining step, i.e., an indication of the setting of the feed transmission of FIG. 3. For this purpose, the wiper 85e connected with the shaft 86 of the feed storage switch 85 is made to move through sixteen successive positions as the relative feed rate takes on the sixteen possible values (Table II), and to engage sixteen associated stationary contacts. These contacts are connected to spaced taps of a voltage divider, here shown as a resistor 135. The total voltage applied to energize the resistor 135 is the speed voltage on the conductor 134. That is, the lower end of the resistor is connected to the conductor 134 and the upper end connected to ground.

As the switch 85 is set to produce higher feed rates, the wiper 85e in moving from its first toward its sixteenth contact will receive a larger fraction of the "speed voltage" appearing across the resistor 135. The resulting voltage on the wiper 85e is thus directly related (and preferably proportional) to the product of the table speed and saddle feed rate. For example, if the A.C. source voltage across the lines L3, L2 is a constant V volts, the speed voltage on the conductor 134 will be proportional to V$s$, where $s$ represents the table speed and the number of stationary contacts engaged by the wiper 80i. The voltage across the resistor 135 is proportional to V$s$. But the voltage on the wiper 85e is proportional to V$sf$, where $f$ represents the saddle feed rate and the number of the stationary contact engaged by the wiper 85e. Thus, the voltage on the wiper 85e is directly related to the multiplication product of selected table speed $s$ and selected relative feed rate $f$, and is therefore directly related to the absolute feed rate or velocity at which the saddle 30 is moving. Furthermore, the voltage appearing on the wiper 85e is an A.C. voltage of one phase polarity or the other, depending upon whether the saddle is moving in a forward or reverse direction.

It is not essential that the voltage dividers 130 and 135 produce fractional voltages which are exactly proportional to the selected table speed and saddle feed rate. All that is required is that such voltages increase in steps as the table speed and saddle feed rate increase in steps. For optimum performance, however, the taps on the dividers 130 and 135 may be differentially spaced apart by distances which are determined by the sixteen table speeds and sixteen feed rates listed by way of example in Tables I and II, supra.

To utilize this anticipation signal appearing on the wiper 85e, the latter is connected through normally closed relay contacts SD1 to anticipation input terminals AI in the medium and fine discriminators 95 and 96. Referring to FIG. 11, the anticipation signal appearing between the input terminals AI and the ground or reference terminal 105 is transferred through a potentiometer 138 and a resistor 139 to the control electrode 108a, of the amplifier 108. This application of the alternating voltage anticipation signal to the control electrode 108a, which also receives an error signal through the resistor 107, results in the algebraic subtraction of the anticipation signal from the error signal before amplification by the discharge device 108.

It will be recalled that the A.C. error signal appearing across the terminals 105, 106 is of one phase or the opposite phase relative to the A.C. source voltage appearing between the supply lines L3 and L2, depending upon whether the error is positive or negative in sense. If the error is positive or negative, then the direction of saddle movement as selected by the direction storage switch 84 (FIG. 8D) will be in a forward or reverse sense, respectively. Thus, the error signal is positive or negative in phase polarity when the saddle is moving in a forward or reverse direction. The relay contacts FR3 and FR4 are so arranged with reference to the center tapped secondary winding 131b that when the saddle is moving in a forward or reverse direction, the A.C. anticipation signal will be of negative or positive phase polarity. Because the discharge device 108 operates as an algebraic summing amplifier, and because the error signal and the anticipation signal applied to the control electrode 108a through the resistors 107 and 139, respectively, are always of opposite phase, the anticipation signal will be subtracted from the error signal, making the net control or effective control signal smaller than the error signal.

A null response, i.e., simultaneous deenergization of both relays PL and MI, will be produced by the discriminator before the true error signal is reduced to a sufficiently small magnitude to fall within the deadband of the discriminator. Thus, the discriminator is caused to "anticipate" the occurrence of a true null condition and to produce a first null response before the position error is reduced to zero, i.e., before the saddle 30 reaches the end point position designated by the stored position information. Because the anticipation signal which is subtracted from the true error signal to produce the net control signal appearing at the anode 108b is proportional in magnitude to the absolute velocity or feed rate of the saddle 30, this first null response of the discriminator will occur when the translatable element or the saddle 30 is displaced from the desired end point position by a distance which is directly related, and preferably proportional to, the absolute velocity of the saddle 30.

This anticipating response of the medium and fine discriminators 95 and 96 (FIG. 8B) occurs at a time when the coarse discriminator 94 is satisfied since the anticipation never will exceed the deadband of the coarse discriminator. When the two relays in both the medium discriminator 95 and the fine discriminator 96 are both deenergized, indicating an anticipation response, a circuit will be established by those relay contacts (FIG. 8C) to deenergize the final position relay FP. This results in closing of the previously opened relay contacts FP1 (FIG. 5D). Assuming contacts SNC1 to be closed, a slowdown relay SD is thus energized and sealed in through its own normally open contacts SD2.

As soon as the relay SD is picked up and sealed in, its normally closed contacts SD1 (in series with the wiper 85e, FIG. 8B) open, thereby removing the anticipation signal from the discriminators 95 and 96. Thus, these discriminators now work not on a net control signal which is the algebraic difference between the true error signal and the anticipation signal, but rather upon the error signal alone. Accordingly, one or both of the medium and fine discriminators 95 and 96 will not be satisfied and the relay contacts therein will immediately cause the relay FP to be re-energized. While this causes the contacts FP1 to reopen, the relays SD and SDA remain energized. Even though the normally closed contacts SD3 are now open, the previously energized forward or reverse clutch coil FWD or REV remains energized because the contacts FP2 are closed. Motion of the saddle 30 continues at a fine feed rate until the medium and fine discriminators are again satisfied, indicating that the saddle 30 has reached the desired end point position. When the relay FP is deenergized a second time, its contacts FP2 open, thereby interrupting the energization circuit through the direction selector switch 84 to the forward or reverse clutch coils FWD or REV. Thus, the saddle 30 is stopped at the desired end point position after having approached that position at a fine feed rate.

In this connection it should be noted also that the brake coil BR is connected across the voltage supply lines L1, L2 through normally closed final positioning relay contacts FP3 and normally open slowdown relay contacts SD4. Thus, when the saddle is moving the contacts FP3 will be open and the brake coil BR deenergized to disengage the brake 71 (FIG. 3).

From the foregoing, it will be seen that the anticipation computer L receives as its input information indications of the table speed and saddle relative running feed rate, and operates to produce an A.C. anticipation signal directly related in amplitude to the absolute velocity or feed rate of the saddle and agreeable in phase polarity with the direction of saddle movement. This anticipation signal is supplied to the discriminators 95 and 96 where it is always subtracted from the error signal, thus producing anticipating responses by these discriminators which result in deenergization of the final positioning relay prior to the saddle actually reaching the desired end point position. This first response or dropout of the relay FP is utilized to pick up and seal in slowdown relays SD and SDA, the latter serving (in a manner to be described) to make the feed transmission slow the saddle, and the former serving to disconnect the anticipation signal from the discriminators. When the anticipation signal is removed, the discriminators again energize the final positioning relay FP which causes the movement of the saddle to be continued until the end point position is reached and the relay FP again deenergized. Upon this second deenergization of the relay FP, the particular one of the clutch coils FWD or REV which was energized is deactuated, and the brake coil BR is energized to bring the saddle to a quick stop at the desired end point position.

FINE FEED COMPUTER AND CONTROLS

Because the feed transmission (FIG. 3) is driven from the table 21, the absolute running velocity or feed rate of the saddle 30 during any of successive machining steps depends not only upon the running feed selected by the setting of the switch 85, but also upon the table speed selected by the setting of the switch 80. If the feed transmission were always reset to a particular one of the sixteen possible relative feed rates to establish a fine feed prior to stopping of the saddle at each end point position, the absolute value of the running feed rate would be dependent upon the particular speed at which the table is rotating. If the table speed were relatively high, the resulting absolute running feed rate might be so high as to permit overrunning of the saddle beyond the desired end point position. If the table speed is very low, the absolute value of the fine feed rate might be so small as to require an inordinate amount of time for the saddle to travel the anticipated distance to the end point position.

Provision is made, therefore, to compute different values of relative fine feed rates which, on the basis of different selected table speeds, will result in an absolute fine feed velocity which is substantially independent of the table speed setting. This is the function of the fine feed computer R (FIG. 4).

As shown in more detail by FIG. 8B, the fine feed computer R receives an indication of the stored table speed represented by the angular setting of the shaft 81 of the switch 80. More specifically, the fine feed computer R includes the wipers 80e, 80f, 80g and 80h which are set to sixteen different angular positions according to the table speed stored for any machining step by the angular position of the shaft 81. Associated with each of these four wipers are sixteen stationary contacts, selected combinations of which are connected to the D.C. voltage supply line L1. Thus, depending upon the table speed represented by the angular setting of the shaft 81, a certain combination of the four wipers 80e–h will be placed at the potential of the supply line L1.

The wipers 80e–h are connected in circuit through normally open contacts SDA5–8, respectively, with the four feed clutch coils FC1–FC4. Therefore, when the auxiliary slowdown relay SDA is energized to open the contacts SDA1–4 and close the contacts SDA5–8, the four feed clutch coils FC1–FC4 will be energized in a particular combination which depends upon the table speed represented by the setting of the shaft 81. This combination of feed clutch coils FC1–4 which will be energized to produce a fine feed rate when the table 21 is operating at any of its sixteen speeds, is indicated in the following table:

TABLE III.—FINE FEED COMPUTER

| Table Speed | Relative Fine Feed | Absolute Fine Feed (inch/min.) | Energized Clutch Coils | | | |
|---|---|---|---|---|---|---|
| | | | FC1 | FC2 | FC3 | FC4 |
| 1 | 10 | .432 | x | | | x |
| 2 | 10 | .503 | x | | | x |
| 3 | 9 | .408 | | | | x |
| 4 | 9 | .480 | | | | x |
| 5 | 8 | .441 | x | x | x | |
| 6 | 8 | .503 | x | x | x | |
| 7 | 7 | .408 | | x | x | |
| 8 | 7 | .480 | | x | x | |
| 9 | 6 | .384 | x | | x | |
| 10 | 6 | .448 | x | | x | |
| 11 | 5 | .408 | | | x | |
| 12 | 5 | .480 | | | x | |
| 13 | 4 | .384 | x | x | | |
| 14 | 4 | .448 | x | x | | |
| 15 | 3 | .408 | | x | | |
| 16 | 3 | .480 | | x | | |

As shown in the foregoing tabulation, as the table speed is set to any of its sixteen possible values (see Table I), when slowing down action occurs due to pickup of the relay SDA, the particular connections to the stationary contacts associated with the wipers 80e–h (FIG. 5B) will produce different ones of the numbered relative fine feeds set forth in Table II. For example, it will be seen that if the No. 1 table speed is selected so that the wipers 80e–h are engaged with their No. 1 stationary contact, only the wipers 80e and 80h will be connected to the voltage supply line L1 and only the feed clutch coils FC1 and FC4 are energized by current flow through the closed contacts SDA5–8. This combination of energized feed clutches FC1 and FC4 produces the No. 10 relative fine feed rate having a value of 0.018 inch per table revolution (Table II). At the No. 1 table speed of 24 revolutions per minute (Table I), this produces an absolute fine feed rate for the saddle 30 of 0.432 inch per minute (Table III). Other combinations of feed clutches which are energized during fine feed operation will be apparent from Table III.

The absolute fine feed rates in any case are not materially varied from an average value of about 0.460 inch per minute. The figures given by Table III are, of course, merely exemplary. While the absolute fine feed rate imparted to the saddle 30 as it closely approaches a desired end point position is not exactly the same for different table speeds, it does not depart appreciably from a predetermined value.

Through the provision of fine feed computer R, therefore, the value of the absolute fine feed rate given to the saddle 30 as it closely approaches each desired end point position is made substantially independent of the speed at which the table is rotating, thereby enhancing the accuracy with which end point positioning is accomplished.

COMPARISON OF RUNNING AND FINE FEED RATES

In some instances when the selected running feed rate is very low, if the fine feed rate determined by the computer R were put into effect the saddle 30 would actually increase in velocity as it approached the desired end point position. This is undesirable especially where finishing cuts are being made on a workpiece.

To overcome this difficulty, means may be included, described in detail in the parent application, now Patent No. 3,016,778, to sense the running feed rate from the feed rate storage D, sense the fine feed rate which would be produced by the fine feed computer R for the speed at which the table is operating, compare the two, and prevent down-shifting of the feed transmission if the computed fine feed is greater than the running feed.

Referring to FIG. 8C, the wiper 80j always receives a D.C. potential which is related in magnitude to the fine feed rate which is scheduled to be imparted to the saddle 30 as the latter closely approaches an end point position. The wiper 85f receives a D.C. potential which is directly related to the running feed rate imparted to the saddle 30 prior to slowing down. In order to detect and indicate whether the running feed rate is greater or less than the scheduled fine feed rate, the voltages appearing on the wipers 80j and 85f are compared by means of a unidirectionally conductive device or diode 158 connected in series with a comparison relay CR across the wipers 80j and 85f. The diode 158 is here shown as poled to conduct current only if the potential appearing on the wiper 85f exceeds the potential appearing on the wiper 80j. Therefore, the comparison relay will be energized only if the running feed rate exceeds the scheduled fine feed rate. If the comparison relay CR is energized, this means that shift-down to the scheduled fine feed rate should take place, and if the comparison relay CR is not energized this signifies that no shift-down to the scheduled fine feed rate should occur.

The objectives are here accomplished by the normally open contacts CR1 controlled by the comparison relay CR. As shown in FIG. 8D, the relay contacts CR1 will permit the auxiliary slowdown relay SDA to be energized at the same instant that the slowdown relay SD is energized only if the comparison relay CR is picked up. In this event, the contacts SDA1–8 (FIGS. 8A, 8B) will all be actuated so that the feed clutches FC1–4 will be placed under control of the fine feed computer R and downshifting occurs within the feed transmission (FIG. 3) to produce the scheduled fine feed rate of movement for the saddle 30. On the other hand, if the comparison relay CR is deenergized, then when the anticipation response represented by the first deenergization of the final positioning relay FP occurs, the slowdown relay SD will be energized and the operation previously described in connection with the relay FP will occur. However, the slowdown relay SDA will not be energized so that the contacts SDA1–8 all remain in their original positions, and movement of the saddle 30 continues at the previously existing running feed rate until the end point position is reached and the final position relay FP is deenergized a second time.

Thus, the feed transmission is made to shift to a new setting as the saddle 30 closely approaches each desired end point position only if the new setting of the feed transmission will produce a slowing of the saddle 30 relative to the running feed rate at which it was previously moving.

MODIFICATION OR ADJUSTMENT OF PROGRAMMED DATA

In controlling a machine tool such as the vertical turret lathe 20 (FIGURE 1) to repeatedly execute over-all machining operations made up of a plurality of successive machining steps designated from programmed information read from a digitally punched tape or the like, it is impossible in making up the instructions to be followed for each machining step to anticipate and account for a number of variable factors which may affect the dimensions of the finished workpieces. These factors produce small errors and include lead screw backlash or deflection, measurement variables, tool wear, tool deflection which varies with extension of the ram 31 relative to the saddle 30, different tool deflections with different depths of cut, etc. Moreover, if a given program of information for successive steps of operation is to be utilized by a number of similar machine tools of different makes and ages, the lead screw and gearing wear and backlash will be different for each such machine tool. The programmer cannot take this into account.

Simply positioning the saddle 30 or other movable machine tool elements to specified locations along their paths of movement will not assure that the cutting edge of a tool will so engage the workpiece on the table 21 that the workpiece is machined precisely to the desired dimension. Inaccuracies on the order of ±.010 inch are likely to occur due to the factors which cannot be taken into account during programming. Of course, certain end point positions to which the saddle or other machine tool element may be moved are not critical and do not affect the dimensional accuracy of the workpiece. If the saddle is to simply back the cutter away from the workpiece before approaching it at a different level, the point at which the backing movement is terminated is not particularly critical.

In order to make it possible successfully to machine workpieces to a high degree of accuracy from a given program of instructions as to table speeds, feed directions, feed rates, and end point positions for a series of machining steps, according to one of the important features of the invention, provision is here made to permit the operator of the machine tool to "dial in" a position correction which changes the final end point position of the movable machine tool element slightly from that originally called for by the input data. The arrangement is such that an individual correction can be made in the end point position for any number of critical machining steps, and the adjustment when once made for a given step will be taken into account as the same over-all machine operation is repeated a number of times.

In addition to this provision in the control system of means for small dimensional adjustment or modification of programmed end point data, according to a further feature of the invention, means is included in the control system for extending the range of adjustment making possible large dimensional or wide range adjustments of programmed data at the machine tool. Such wide range adjust has, according to the invention, been provided along a plurality of measuring axes to allow multiple axis "tool adjust," that is, means in the machine tool to account for differences between normal and actual tool length and tool standout. In a further use of this invention, means is provided for wide range adjust along one or a plurality of axes to allow "origin adjust."

Small dimensional adjustment

In accomplishing the provision of means for modifying programmed end point data to account for small dimensional variations, a plurality of position adjustors or correction signal generators are utilized, and a particular one of such devices is brought into operative effect for a particular one of the steps of a machining operation by selection according to information included as a part of the instructions for that machining step. The data or selection code designating the particular adjustment device to be effective during a given machining step is stored by the selected adjustor storage F (FIG. 4) which, in turn, picks out one of a plurality of adjustors Q and makes the latter effective to supply a correction signal to the discriminators K. The correction signal is of a polarity and magnitude determined by the setting of the adjustor device. It is algebraically added to the error signal supplied to the discriminators, thus causing the latter to produce a null response and terminate movement of the translatable machine tool element, when the latter reaches some final position which is displaced the desired amount and direction from the end point position designated by the data held in the end position storage E.

An exemplary embodiment of such position correcting means is illustrated in part by FIG. 9. As there shown, a transformer 160 has its primary winding 160a connected across the A.C. voltage supply lines L3, L2, and its secondary winding 160b, provided with a grounded center tap. The A.C. voltages appearing on the output leads 160c, 160d of the secondary winding 160b, are, therefore, of like amplitude but of opposite phase polarity. To store information from the data reader A (FIG. 4) which designates a particular one of plural adjusting devices which is to be effective during a given machining step, a multi-point switch 165 (FIG. 9) is employed, having wipers 165a, 165b connected to a common shaft 166. That shaft and the associated wipers may be set to any of a plurality of angular positions so that the wipers engage any of a corresponding plurality of stationary contacts in response to data received from the reader A of FIG. 4.

For example, the switch 165 may be a stepping switch which is set to any of its possible positions in response to information read from a punched tape by the data input reader. Because this is a well known technique, the apparatus for setting the switch shaft 166 has not been shown.

The adjustment devices of correction signal generators have here been illustrated as a plurality of potentiometers P1, P2, P3, P4, P5 . . . Pn. The lower extremities of these potentiometers are all connected to the lead 160d. The upper ends of these potentiometers are selectively connected, one at a time, to the output conductor 160c through the wiper 165a. As the shaft 166 is set to successive ones of its angular positions, the wiper 165a successively connects the lead 160c to the upper extremity of the potentiometers P1, P2, P3, P4, P5 . . . Pn. In this manner, the setting of the switch 165 is made to select, i.e., energize, a particular one of several available potentiometers.

To indicate which one of the potentiometers is effective at any instant to provide for adjustment in the end point position of the saddle 30, each potentiometer has connected in parallel therewith a pilot lamp P1a, P2a, P3a, etc. Whenever any one of the potentiometers is selected and energized, the corresponding pilot lamp will be lighted to signify to the operator which potentiometer will cause a change in the final position to which the saddle 30 is moved.

Each of the potentiometers has a manually adjustable wiper P1b, P2b, P3b, P4b . . . Pnb. When the wiper of a selected potentiometer is at the midpoint position, it will receive zero voltage or ground potential inasmuch as the opposite ends of the potentiometer are connected across the center tapped secondary winding 160b. If, however, the wiper is moved in one direction or the other from the center position, it will receive a progressively higher amplitude A.C. voltage of one phase polarity or the other, i.e., either in phase with the supply voltage appearing across the lines L2, L3 or out-of-phase therewith.

In order to transfer this correction signal which appears on the wiper of the selected potentiometer, all of the wipers P1b–Pnb are connected to the respective stationary contacts associated with the switch wiper 165b. Thus, for example, if the switch wiper 165a is in its second position so as to energize the potentiometer P2 by connecting it across the secondary winding 160b, the switch wiper 165b will also be in its second position, thereby connecting the potentiometer wiper P2b to the switch wiper 165b.

The switch wiper 165b (FIG. 9) leads directly to two correction input terminals CI in the medium and fine resolvers 95, 96 (FIG. 8C). In order to understand how these correction signals effect changes in the final end point position to which the saddle 30 is moved, reference should be had to FIG. 11. As there shown, the A.C. voltage correction signal (which is of an amplitude and phase polarity determined by the setting of the effective potentiometer wiper) appears between the input terminals CI and 105. A proportion of this correction signal is picked off by a potentiometer 170, and passed through a resistor 171 to the control electrode 108a of the summing amplifier 108. The correction signal constitutes in itself a relatively small amplitude "error" signal which is either positive or negative in sense. The principal error signal applied to the terminals 105, 106 is of a magnitude related to the discrepancy between the actual position of the saddle 30 and the desired position represented by the information in the programmed end point storage means. This also may be positive or negative in sense, i.e., of one phase polarity or the other. The summing amplifier 108 operates to algebraically add the error signal appearing on the terminals 106, 105 and the correction signal appearing between the terminal CI, 105 (as well as the anticipation signal if it is then appearing between the terminal A1, 105). As a result of this algebraic addition, the amplified net control signal appearing at the anode 108b is greater or less than it would be if only the true error signal had been amplified, and by an amount which is determined by the setting of the wiper for the selected potentiometer or correction generator.

As the discriminator of FIG. 11 causes one or the other of the relays PL, MI to be energized and thereby effects movement of the saddle 30 toward the desired end point position, the true error signal appearing between the terminals 106, 105 will be progressively decreased in amplitude. However, a null response will occur only when the net control signal derived by algebraic addition of the true error signal and the correction signal has been reduced to less than a predetermined magnitude. Therefore, both relays PL, MI will be simultaneously deenergized to signify a null response when the saddle 30 has been moved not to the position designated by the stored end point data, but to a position within the deadband which is centered about that end point plus or minus a small incremental distance which is represented by the setting of the selected correction potentiometer.

As a matter of convenience, the manually adjustable potentiometer wipers P1b through Pnb (FIG. 9) may be associated with scales calibrated directly in thousandths of an inch to let the operator "dial in" to the desired position correction.

During an initial run from a given program of information, the saddle 30 can be stopped at the end of each positioning step. The dimension which will be machined on the workpiece with the saddle in that position can be measured after moving the ram vertically a slight amount under manual control to make a test cut. In the event that a dimensional inaccuracy exists, the operator can back the movable saddle 30 so that the cutter is withdrawn from the workpiece, and then make an appropriate adjustment in the setting of the selected potentiometer. The positioning step is then repeated, a second test cut made, and the workpiece again measured to see if the final position resulting from the programmed end point, as modified by the corrective action of the adjusted potentiometer, does produce exactly the desired dimension on the workpiece.

This procedure can be repeated at the end of each of the critical positioning steps during the initial run or set up operation. Once an initial run has been made and the potentiometers selected for certain ones of the steps adjusted to provide necessary positional corrections, those potentiometers are left in their settings. Then, when the over-all machining operation is repeated any number of times to produce a plurality of identical workpieces, each time that the control system receives input data for a given machining step, the selector switch 165 (FIG. 9) will be set to the same position, so that the same correction potentiometer will be placed in effective connection with the discriminators and the same modification or correction in the final end point position achieved.

The apparatus for accomplishing the correction or adjustment of saddle positions relative to those which are programmed and designated by information fed to the reader A has been described in some detail above. Nevertheless, it is believed that a better understanding of the over-all relationships and cooperative operation of the system components in producing this advantageous result will be better understood through a brief summary with reference to FIG. 5. FIG. 5 is diagrammatic in form, and illustrates only those parts of the present system which are concerned with the position correction or adjustment feature.

Referring to FIG. 5, the input reader A receives successive sets or blocks of information from a suitable record such as the punched tape 200. As noted previously, each block or set of information may contain a designation of the selected lathe table speed, the selected relative feed rate for the saddle 30, and the desired end point position. It is, as noted above, impossible for the programmer who makes up these sets of information in the first instance to foresee and provide for tool wear, tool deflection, or backlash and imperfections in the machine tool gearing and lead screws. Instead, the programmer may include in each block of information a selection code which will correspond to a particular one of several different adjustors or correction signal generators. As the reader A senses each block of information, therefore, it will not only transmit the desired position information to the position storage E, but it will also transmit any selection code to the selected correction device storage F.

Such selection codes are here identified in three successive blocks on the punched tape 200 as SC(P1), SC(P2) and SC(P3). In response to the receipt of these respective selection codes, the correction device storage F sets the movable wiper 165a of a stepping switch 165 to a corresponding contact point leading to rheostats P1, P2, or P3.

The rheostats are here shown as one form of adjustable signal sources or generators. It will be noted that all of these rheostats are connected across a voltage source, so that the voltage appearing on their wipers and transferred through the stepping switch 165 to an algebraic summing device K depends upon the position to which those potentiometer wipers are adjusted.

In operation, therefore, as each block of information is received, the programmed end point position is transferred to the position storage E and the selection code is transferred to the storage F. Assuming that the selection code SC(P1) is read, the wiper 165a will take the position illustrated in FIG. 5, and the wiper of the potentiometer P1 will thus be connected to supply a correction signal as one input to the algebraic summing device K.

The position comparator shown in FIG. 5 receives as its first input signals from the position storage E which are indicative of the programmed end point position; it receives as its second input from a position sensor information or signals which represent the actual position of the saddle 30. The output of the position comparator is a first or true error signal which is transferred as a second input to the algebraic summing device K. The output of the summing device appearing on a line 220 is thus a composite control signal which is the algebraic sum of the error signal and the correction signal picked off of the potentiometer P1. This composite or net control signal is supplied to drive means I, P which rotate the lead screw 36 to move the saddle 30 until it reaches a position at which the composite signal is reduced to zero. At this time, the true error signal produced by the position comparator may not be zero. Thus, the final position of the saddle 30 is not that which has been programmed or designated by the information originally fed to the reader A, but is a position which is displaced therefrom by a distance which depends upon the setting of the wiper of potentiometer P1, and thus the magnitude of the correction signal taken from that selected potentiometer.

The operator of the machine tool may adjust the wiper of the potentiometer P1 in order to change the final position of the saddle 30, and thereby compensate for tool wear, tool deflection or other factors which the programmer could not take into account.

When the next step of the over-all machining operation is effected by the reader A receiving the next block of information, a different one of the several potentiometers P1 through P5 may be selected due to a different selection code being included in that block of information. Thus, the corrective displacement of the machine tool will depend upon the adjustment of the wiper for that particular potentiometer.

Once the operator has put the machine tool through a complete cycle for machining a given workpiece, and has adjusted the different potentiometers to produce the precise positioning of the saddle 30 and cutter carried thereby during each step, the system may operate repeatedly to produce a large number of workpieces. The previously established corrective displacements for each step of the program are automatically accomplished because the same selection code will cause the wiper 165a to connect with the corresponding potentiometer during repetition of any given step.

This represents a very significant improvement and advantage in the automatic control of machine tools, and permits programmed data carried on a punched tape or other record to be used with a variety of different machines and under different conditions of tool wear and deflection.

*Small dimensional adjustment—operation*

It is believed that the operation of the system will be generally understood from the foregoing description of the results provided by the special control features. However, it will be helpful to review the operation in its entirety and with reference to means for effecting different modes of operation. These modes of operation are selectively obtained by setting a mode selector MS (FIG. 4) which is here illustrated (FIG. 8D) as a manually adjustable four-point switch 185 having ganged wipers 185a, 185b. Each of these wipers is adapted to simultaneously connect to stationary contacts which are here labeled "auto," "ss," "rpt" and "man" designating automatic, single cycle, repeat and manual modes of operation.

Portions of the data input reader A are shown in FIG. 8D. Since the reader, e.g., a punched tape reader, may be of well known organization, only certain components thereof are shown. These include a read relay RE which when energized causes the reader to begin reading a block of data for one step of machining operations, and a read-complete relay RCR which is energized to stop the reader after one each such block of data has been read.

With the foregoing in mind, let it be assumed that the mode selector switch 185 is in the "auto" position, that all relays in FIGS. 8A–D are deactuated, and that the data input reader A contains a punched tape or other record which has digital information thereon designating the table speed, saddle direction of motion, saddle running feed rate, saddle end position, and a selected one of the correction or adjustor devices (where necessary) for each of the successive machining steps to be accomplished in a complete machining operation.

The operator initiates the action by momentarily depressing a start switch ST (FIG. 8D) so that the contacts thereof momentarily complete a circuit through a diode 190 and the coil of the read relay RE, which picks up and seals in through its own contacts RE1 and normally closed contacts RCR1. The reader thus begins reading information and successively supplies signals to set the switch 80 (FIG. 8A) to angular position representing the table speed for the first machining step; to set the switch 85 to a position representing the running feed rate for that machining step; to set the direction selector switch 84 (FIG. 8D) to that position corresponding to the direction of movement of the saddle 30, to set the end position storage means E (FIGS. 5 and 9) to represent digitally the programmed end point position for that step, and to set the storage switch 165 to that position which corresponds to a selected one of the correction potentiometers.

As switch 80 reaches the desired position, the wipers 80a–d energize the speed clutch coils S1–4 in a particular combination to drive the table 21 at the programmed speed. Moreover, as the switch 85 reaches the position corresponding to the programmed running feed rate the wipers 85a–d will complete circuits including the normally closed contacts SDA1–4 to energize a particular combination of the feed clutches FC1–4, so that when either the forward or reverse clutch coil FWD or REV is energized, the saddle 30 will be moved at the programmed relative feed rate. The direction selector switch will prepare a circuit either to the forward clutch coil FWD or the reverse clutch coil REV depending upon the programmed direction of movement. The end point position storage means will supply appropriate signals in digital form to the digital-to-analog converters J1 (FIG. 10) so that the resolvers 90–92 will supply error signals to the discriminators 94–96, thereby causing the relay contacts associated therewith (FIG. 8B) to establish an energization circuit for the fine position relay FP. The latter will be picked up so that its contacts FP1 open, its contacts FP2 close and its contacts FP3 open. Finally, the switch 165 (FIG. 9) will energize the selected one of the correction generators or potentiometers from the transformer secondary winding 160b, causing the associated pilot lamp to be energized to signal to the operator which one of these potentiometers is effective. Moreover, the switch wiper 165b will connect the adjustable wiper of the selected potentiometer to the input terminal CI of the medium and fine discriminators 95, 96.

When the tape reader has read all of this information constituting one "block" corresponding to the first machining step, it will supply energization current (by means not shown) to a terminal 192 (FIG. 8D) so as to energize the coil of the read-complete relay RCR. The latter will pick up and seal in through its own normally open contacts RCR2 and the normally closed contacts SNC2, also opening the contacts RCR1 to deenergize the relay RE and terminate the reading operation.

As soon as the relay RCR picks up, indicating that the first block of data has been completely read, its contacts RCR3 will close, thereby completing a circuit from the voltage supply line L1 through the normally closed contacts SD3, the direction selector switch 84 and either the normally closed contacts TR18 or TR20 to energize the forward or reverse clutch coil FWD or REV. Assuming that the switch 84 is in the position shown, the forward clutch coil FWD is energized.

Simultaneously, the forward relay FR (FIG. 8D) will be energized so that its contacts FR1 and FR2 (FIG. 8C) respectively close and open to connect the relay contacts of all the discriminators 94, 95, 96 in circuit with the final positioning relay FP. The latter will be energized because a positive error response is now being sensed by all those discriminators. Moreover, the relay contacts FR3 and FR4 will respectively close and open so that the conductor 132A will be connected to the conductor 134, making the anticipation signal produced by the anticipation computer L of a phase polarity which is opposite to that of the error signals produced by the resolvers as the saddle 30 approaches the end point position.

When the forward clutch coil FWD is energized, the clutch 68 establishes drive to the lead screw 36 (FIG. 3) for the saddle 30, so that the latter begins moving in a forward direction toward the desired end point position. The error signal supplied by the resolver 90 to the coarse discriminator 94 will progressively decrease in amplitude until the coarse resolver 94 is satisfied and both of its relays are deenergized at which time the saddle has shifted into the closer target range. At this time, however, the relay FP will remain energized by current flow from the voltage supply line L1 through contacts of the relays within the medium or fine discriminators 95, 96. It will be understood that because of the step down gear drives for the resolvers that the fine resolver will pass through multiple nulls for each time the medium resolver reaches a null and likewise for the medium and coarse resolvers.

The error signals supplied to these discriminators by the medium and fine resolvers 91 and 92 will be progressively diminishing in amplitude as the saddle 30 approaches the desired position.

The operation of the discriminators 94, 95, 96 and the final position relay FP is such that this relay is held in first by the coarse discriminator 94, and as the saddle approaches the end point it moves into the next target range in which the final position relay FP is controlled by the medium discriminator 95, and as the saddle moves into the final target range control shifts to the fine discriminator. As the saddle reaches a distance from the end point within the resolution power of the fine resolver, then the medium and coarse resolvers will be satisfied and the error signal from the fine resolver will be decreasing in amplitude as the saddle approaches the desired position, until the null is reached whereupon the final position relay will drop out.

In order to prevent overshoot, means is included to slow down the saddle in anticipation of the end point, accordingly, when the saddle 30 reaches a position which is displaced from the end point position by a distance which is substantially proportional to the absolute velocity at which the saddle is moving, then the medium and fine discriminators 95 and 96 will produce a null response, even though the error signals received from their associated resolvers have not been reduced to null values. This is because the anticipation signal supplied from the anticipation computer L, as previously described, to the medium and fine discriminators subtracts from the true error signals, so that the relay FP is deenergized in anticipation of the saddle reaching the desired final position.

When the relay FP drops out, its contacts FP1 reclose, thereby creating an energization circuit through normally closed contacts SNC1 to pick up the slowdown relay SD. This latter relay seals in through its own contacts SD2 so that it will remain energized even though the contacts FP1 subsequently reopen.

When the relay SDA picks up, it opens the normally closed contacts SDA1–4 and closes the normally open contacts SDA5–8. Accordingly, the switch wipers 85a–d are removed from controlling relationship with the feed clutch coils FC1–4, and instead, the switch wipers 80e–h within the fine feed computer R are placed in circuit with those clutch coils to energize them in a particular combination, which, taking into account the speed at which the table 21 is rotating, will produce a predetermined absolute fine feed rate of saddle movement. Thus, the saddle continues to move toward the programmed end point position but at a much slower rate so that it is not likely to overrun when the drive thereto is terminated.

As soon as the slowdown relay was energized, its normally closed contacts SD1 (FIG. 8B) opened, thereby disconnecting the anticipation signal supplied by the computer L from the discriminators 95 and 96. Since the net effective error signal is in this manner increased by removing the subtracted anticipation signal, these discriminators detect a position error and, in the present example, will have the relays PL therein energized.

Moreover, when relay FP initially drops out to close its contacts FP3, the relay SD picks up so that the contacts SD–4 close. But as soon as the relay SD picks up to close the contacts SD4, the relay FP is again energized to reopen the contacts FP3 thereby preventing energization of the brake coil BR. Thus, continuity of motion is achieved, although the saddle 30 is slowed to a fine feed rate.

As the saddle 30 approaches the end point position, the error signals supplied by the resolvers 91 and 92 to the discriminators 95 and 96 will be further diminished in amplitude. When the algebraic sum of these error signals and the correction signals supplied from the selected one of the correction potentiometers diminishes to less than a predetermined magnitude, then both discriminators 94 and 95 will produce a null response and have both of the relays therein simultaneously deenergized. This will not necessarily occur when the saddle 30 is exactly at the position designated by the stored end point position data, but on the contrary, may occur at some point displaced from that position depending upon the adjustment given to the wiper of the selected correction potentiometer.

In any event, as soon as both the medium and fine discriminators 95 and 96 produce a null response, the relay contacts PL2a, PL2b, MI2a, MI2b, PL3a, MI3a (FIG. 8C) therein will cause the final positioning relay FP to drop out a second time. As a first result of this, the relay contacts FP2 open. Since the contacts SD3 are now open, the forward clutch coil FWD will be deenergized so that drive to the lead screw 36 (FIG. 3) is terminated. Moreover, the contacts FP3 will reclose, and since the contacts SD4 are at this instant closed, the brake coil BR will be energized to engage the brake 71 (FIG. 3) and bring the lead screw 36 and the saddle 30 to a quick stop.

When current flows through contacts SD4, FP3 to the brake coil BR, it also passes over a conductor 150 (FIG. 8C) to energize a relay SNC, pick-up of which signifies starting of the next cycle. The contacts SNC1 open to break the sealing circuit for the slowdown relays SD and SDA so that the latter drop out. The contacts SNC2 open, thereby dropping out the read complete relay RCR. Moreover, current flows from the conductor 150 through the mode selector switch wiper 185a (in the "auto" position) and the diode 190 to energize the read relay RE, which again picks up and seals in through its own contacts RE1. Thus, the reading device A is started to read another block of input data and to reset the various storage devices according to information designating the table speed, saddle direction of motion, saddle running feed rate, saddle end position and the selected correction potentiometer for the next machining cycle or step. With this, the table speed storage switch 80, saddle direction switch 84, saddle feed rate storage switch 82, end point position storage switches E, and selected adjustor storage switch 165 are all properly conditioned to carry out the next machining step. When all data for the next step has been received, the foregoing cycle of operations is repeated.

During each machining cycle or step, the table 21 will be rotated at the selected one of several possible speeds. The saddle 30 will be moved at the selected one of several possible relative running feed rates. When the resolvers produce a null response, even though ahead of the actual end point by an anticipation distance, this produces anticipatory drop-out of the relay FP. This causes pick-up of the slowdown relays SD and SDA. The feed transmission is down-shifted to make the saddle 30 approach the final position at an absolute fine feed rate which is substantially independent of the table speed. The position correcting potentiometer which has been selected will produce a correction signal which is algebraically added to the position error signal. Thus, the discriminators produce a null response and cause stopping of the saddle precisely at a final position which is corrected (according to the setting of the selected correction potentiometer) from that end point position represented by storage in the end point storage means.

In order to establish initially the necessary settings of the various potentiometers which are selected by the programmed data for respective ones of the machining steps, it is desirable to be able to make the machine tool stop after each step of an initial run, and if necessary, to make a test cut on the workpiece so that the operator can measure and correct the dimension obtained. This is here made possible by the mode selector switch 185 when the wipers 185a, 185b are set to the "ss" or single cycle position. Under these circumstances when the start switch ST is momentarily depressed, the same operation previously described will take place during the first step of the programmed operation. However, after that step has been completed and the saddle 30 brought to a stop, the energization of the conductor 150 and the relay SNC cannot result in reenergization of the read relay RE. Accordingly, the machine operation ceases.

The mode selector switch is then set to place the wipers 185a, 185b in the "man" position, thereby energizing a transfer relay TR. With this, the speed clutch coils SC1-4, the feed clutch coils FC1-4, the forward, reverse and brake coils FWD, REV, BR will all be disconnected from the control circuitry of FIGS. 8A-C by opening of the normally closed contacts for the relay TR. At the same time, these speed clutch coils, feed clutch coils, forward, reverse, and brake coils, will all be connected by closure of normally opened transfer relay contacts to individual terminals here labeled m. These terminals lead to conventional manual control circuits of the type fully illustrated and described in the above-identified Hollis patent. Therefore, the operator may actuate the conventional controls of the vertical turret lathe 20 in order to make a test cut on the workpiece. The table 21 is then stopped.

The operator may then measure the dimensions cut on the workpiece. If it is found to be inaccurate, he can make an appropriate adjustment of the wiper for the selected correction potentiometer, i.e., the one indicated by the particular one of the energized pilot lamps (FIG. 9).

Following such adjustment, the saddle 30 is moved under manual control to shift the cutter back away from the workpiece.

Next, the mode selector switch 185 is set to the repeat position "rpt", and a "repeat" pushbutton switch depressed. This completed an energization circuit through the wiper 185b for a repeat relay RR, which picks up and seals in through its own contacts RR1. Normally open contacts RR2 will close to establish an energization circuit for the forward clutch coil FWD. Since the saddle has been backed away from the end point position, the resolvers 90-92 will be supplying error signals to the discriminators 94-96 so that the previously executed step will be repeated utilizing the information previously stored. At the end of that step when the brake coil BR is energized and current is supplied over the conductor 150 to the relay SNC, the normally closed contacts SNC3 will momentarily open to deenergize the repeat relay RR.

The operator may thus back the cutter away from the work and repeat a given step as many times as may be desired, readjusting the selected potentiometer as may be necessary. When the precise dimension of the workpiece is obtained, the mode selector switch 185 is set to the single cycle position "ss", and the start switch ST momentarily depressed. This makes the read relay RE pick up and seal in, so that the data input reader A reads the next block of information from the punched tape or other record. All of the storage means will therefore be reconditioned in accordance with information for the next step, and the cycle of operation previously described will be carried out to produce that step. When that second step is completed, however, the read relay RE will not be automatically reenergized because the wiper 185a in the "ss" position does not receive current from the conductor 150 at the end of the cycle. Therefore, the machine will stop at the end of the second step. The procedure described above of measuring the workpiece and setting the second selected correction potentiometer to correct for variable factors not taken into account by the stored end position information can be repeated.

In this manner, all of the steps of the machining operation can be carried out one at a time and appropriate settings made for the different ones of the correction potentiometers which are rendered effective during different ones of those steps.

Once these settings for the correction potentiometers have been made during the initial run the mode selector switch MS may be placed in the "auto" position and the entire series of steps constituting a complete machining operation produced in succession with the previously established position corrections associated with each step automatically being taken into account. As many identical workpieces as may be desired can be produced by repeating the complete machining operation on each.

Figures 1, 1A:
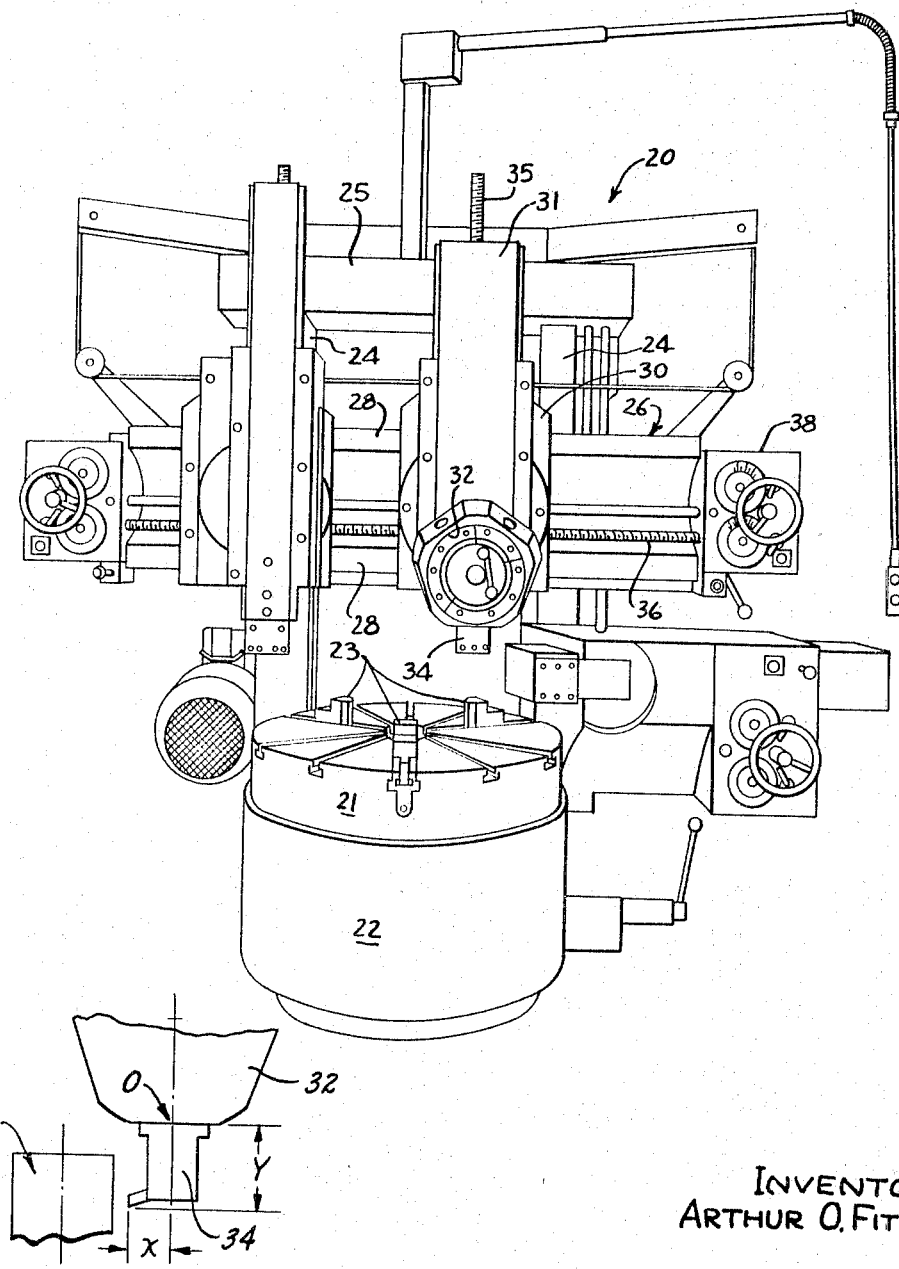
FIGURE 1 is a front elevation of an exemplary machine tool with which the invention is employed.
FIG. 1A is a diagram illustrating "tool adjust" axes of adjustment on a turret lathe.

There has been provided an especially advantageous system for automatically controlling machine tools, such as the vertical turret lathe 20 of FIGURE 1. Position corrections for each of a number of successive pre-programmed machining steps can be "dialed in" in order to compensate for variable factors such as tool wear or deflection under load which cannot be taken into account during programming. These position corrections are easily made by operating the control system in the single cycle, manual, and repeat modes during an initial setup run. Once those position corrections have been made, then the system may be operated in the automatic mode so that each of the steps are successively carried out.

Wide range adjustment

With the system hereinbefore described involving position adjustors in the form of adjustable rheostats which, in effect, shift the angular position at which the fine resolver rotor 92b produces a null signal, there is a definite limit on the magnitude of the adjustments that may be made due to apparatus limitations. This will be understood from an examination of the physical construction of the resolver and of its operation electrically. With any resolver of the kind described, a null is reached at 0° and 180°; that is, at the two positions of the resolver rotor where it is angularly aligned with the field vector produced by the sine and cosine voltages supplied to the field windings respectively. In such position of the rotor no output voltage is induced in the rotor. Accordingly, the maximum that the null could possibly be shifted in any single resolver would be 90° from either the 0° or 180° null point. It will be recalled that in the present system the fine resolver rotates through 360° for each .10" of lead screw motion. With such resolver 90° of rotor motion would represent ¼ revolution or .025" as the maximum possible distance that the null point could be shifted. In the present circuit arrangement, which includes a discriminator circuit (FIG. 11) to accept the null signal and responsive thereto to deactuate the feed clutches, it has been found that, as a practical matter, the discriminator circuit will not operate properly when an error signal is introduced representing greater than about 36° of resolver rotor motion. 36° of the fine resolver rotor motion is equal to about .010" of linear saddle motion and thus .010" (ten thousandths) constitutes about the maximum adjustment or modification that can be introduced with the present system where position adjustors P1 to P5 (FIG. 9) are used to introduce and add a bias voltage to the signal from the fine resolver 92 that is employed to actuate the discriminator circuit.

Explaining the foregoing with reference to FIG. 12, the sine curve $R_1$ represents the output voltage from the rotor of the fine resolver. With no bias voltage from the position adjustors it will be noticed that this voltage curve $R_1$ swings negative and then positive as the rotor is turned through 360°, passing through two nulls. Thus the signal $R_1$ is supplied to the discriminator circuit 96 and represents the "error" signal which is algebraically added with the "correction" or adjustment signal supplied to this circuit from the rheostats P1 to P5.

If a negative bias voltage $A_1$ representing the "correction" or adjustment voltage from a position adjustor P1 to P5 is introduced and added to the signal $R_1$ the resultant signal is shown by the curve $R_2$. It will be observed that with an illustrative negative bias voltage $A_1$, the null point has shifted from $X_1$ to $X_2$, representing 18° approximately of rotor motion, which is equivalent to approximately .005" of saddle movement. Now referring to FIG. 12, it will be seen that if a negative bias voltage of $A_2$ is introduced, the voltage curve $R_3$ is always negative, just touches the zero axis and, therefore, does not pass through zero or produce a null. It has been found that the discriminator circuit of FIG. 11 will not respond to such a voltage input signal to cause the thyratrons 120, 121 to fire and disconnect the feed clutches and stop the saddle lead screw. Indeed, it has been found that the maximum bias voltage which may be introduced is the value $A_3$, FIG. 12, which results in a shift in the null point from $X_1$ to $X_3$, equivalent to about 36° of the fine resolver rotor motion, or .010" of saddle motion.

The small dimensional adjustment system described hereinbefore, therefore, involves end point modification or adjustment by shifting the null point of the fine resolver 92 and is, therefore, logically limited to small distance adjustments. To achieve the provision of means for end point modification or adjustment beyond such dimensional limitations, the present invention provides means for producing signals representing the modifying data and combining such signals with signals representing the programmed data, before such programmed data signals or their analog equivalent are converted by the resolver system into position error or displacement signals. In this manner the limitation that the maximum possible distance is confined to the linear distance corresponding to 90° of motion of the fine resolver, and, practically speaking, substantially less than that, is completely swept away.

A control system including one preferred means for achieving this result is illustrated diagrammatically in FIG. 6. It will be seen by reference to this figure that provision is made, herein shown as a wide range selection storage FW and wide range adjustors in the blocks so labaled for dialing in a distance or dimension at the machine tool that is to be introduced to modify the end point position number read from the tape. According to the block diagram, the signal from the wide range selection storage FW is combined with the signal from the digital-to-analog converters JC. In this manner the field vectors representing the end point and produced by resolving the sine and cosine voltages from the digital-to-analog converters are shifted in angle according to the magnitude of the dialed in wide range adjustment. This operation upon the sine and cosine analog voltages is achieved by means herein shown in FIG. 15 as a circuit simulating a differential resolver RD and this embodiment of the invention, therefore, will be referred to herein as the differential resolver method. It will be understood that the modified sine and cosine voltages from the differential resolver RD are supplied to the resolvers JR which produce an error signal continuously representing the distance to the end point, and which is utilized, via the discriminators K to actuate the drive (feed) means.

A control system including an alternative means for wide range adjustment or modification of end position data is shown in the block diagram of FIG. 7. While the control system of FIG. 6 contemplates combining by means of a differential resolver RD the analog sine and cosine voltages equivalent to the digital information read from the tape (i.e., *after* the digital programmed data signal has been converted to sine and cosine voltages), with a signal representing dimensional adjustment or modification, in the present alternative case such dimensional adjustment or modification signal is combined with the digital programmed data signal *before* the latter is converted to electrical analog voltages. To achieve this result, according to FIG. 7, the output from the tape reader (digital) is combined or summed with the output from the X axis or Y axis wide range adjusters W (digital) and the combined signals (digital) are then converted to analog sine and cosine voltages by means herein shown as digital-to-analog converters JC. This second embodiment, therefore, will be referred to as the digital summing method.

Differential resolver method

Referring to FIG. 4, it will be seen that this figure diagrammatically shows the different embodiments of the invention for end point position modification. For small dimensional adjustment the data input reader A provides a signal from each block of data on the tape which actuates the selected adjustor storage F to select a particular one of the position adjustors, or rheostats, for a particular one of the steps of a machining operation. In this manner a particular device is selected in which previously dialed in modifying data is stored. This feature is retained in the present system which affords such small adjustment means as well as wide adjustment means. The previous description had been confined to a system affording small distance adjustments along a single axis although it will be readily understood that this system may be expanded to provide for adjustment along one of several axes and, in practice, provision will usually be made for dialing in adjustments to a plurality of axes and the block of information on the tape will contain information as to along which axis measurement is made. The present system will be described in connection with multiple axis adjustments to illustrate how such a system will be constructed in practice.

Referring to FIG. 6, this block diagram illustrates a control system having small dimensional adjustment means and also having means providing wide range adjustment along one or a plurality of axes. This is diagrammatically shown in FIG. 6 wherein the wide range adjustors W include banks of switches or equivalent means for setting in a large dimension modification along a plurality of axes. The input reader A also provides a signal which selects a particular bank of switches or the like for a particular machining operation or series of operations, and designates the measurement axis. This is generally in keeping with the previously disclosed system although the selection signal is derived differently in the present case. The presently disclosed system has particular utility to provide a "tool adjust" in the machine tool control, that is, a means for setting in the difference between the nominal tool length or tool standout, which is utilized by the programmer in dimensionally establishing the end point position, and the actual tool length or tool standout which may vary from the nominal dimension for a particular tooling setup by a substantial amount or the programmer can assume no tool length or tool standout and the full amounts for the X and Y tool dimensions can be dialed in by the operator. Of course it is not limited to such a use, however, for illustrative purposes the invention will be described in connection with a "tool adjust" provision.

Referring to FIG. 1A, "tool adjust" contemplates adjustment for "tool length" and "tool standout." Tool length as used herein is measured from the face of the turret to the cutting edge which is vertical dimension Y, while tool standout is measured horizontally (X) from a point aligned with the center of the tool holder. Hence, tool length is measured along the conventional Y axis while tool standout is measured along the conventional X axis. In the present case, therefore, for tool adjust the apparatus provides adjustment along two axes. To serve this function, the "wide range adjustors" block FW includes, as shown in FIG. 13, a bank of X axis switches 300 and a bank of Y axis switches 302. With "tool adjust," the same correction or modification will be desired for each tool and, therefore, for a turret lathe having a five-tool turret, five sets of switches in each of the X and Y axis banks will be needed, one set of switches for each turret position.

In my copending application Ser. No. 763,103, filed Sept. 24, 1958, entitled "Positioning Control Apparatus," a digital-to-analog converter is described in detail which provides means for converting the tape derived digital information as to end point address of a machine member into electrical analog sine and cosine voltages. As therein described, the control apparatus includes a plurality of synchro devices or resolvers, such devices being geared with different ratios to the movable machine member in the manner shown in FIG. 14 and excited with analog signals representing progressively lower order digits of the end point address number. When the error signals from all resolvers are simultaneously zero, then the desired position has been reached, and movement is terminated. Referring to FIG. 14, the positioning system herein shown employs coarse, medium and fine resolvers 90, 91, 92 each of which is drivingly connected to the controlled movable machine member through different ratio gear means. The coarse resolver 90 is drivingly connected to the lead screw by the gear means such that its rotor turns at a rate of one revolution per ten inches of travel of the machine member although it will be understood that this is exemplary only, and an additional resolver may be readily incorporated and driven at one-tenth the rate of the coarse resolver 90 to extend the range of movement of the saddle. On the other hand, the rotors of the medium and fine resolvers 91, 92 are drivingly connected to the lead screw such that they respectively turn at a rate of one revolution per inch and one revolution per 0.1 inch of travel of the element 64. Since it is preferable to limit the total range of the machine member such that the shaft of the coarse resolver 90 cannot make more than one-half revolution, because the resolver produces a null at two rotor angular positions spaced by 180°, the effective range of motion of the machine member with the illustrated three resolver apparatus is 5″. It will readily be appreciated that with one additional resolver the range will be extended to 50″ and with two resolvers, to 500″.

In digital terms, the coarse resolver 90 provides resolution to the nearest tenth of an inch (1.0 to 4.9) the medium resolver 91 to the nearest hundredth of an inch (.01 to .99), and the fine resolver 92 to the nearest thousandth of an inch (.001 to .009). In practice, additional resolvers may and usually will be added to account for distances greater than 5″ and to provide for closer fine range adjustments.

To be compatible with the other portions of the system as disclosed, the wide range adjustors W (as shown in FIG. 13) include means for dialing in and storing a four place or four digit number. A plurality of independently actuable sets of switches in two banks 300, 302 are provided for wide range adjustment, each set including four switches SW–1 to SW–4. With these switches the inch units of end position modification are set using the first switch "1," the tenths of an inch are set using the second switch "2," the hundredths of an inch are set using the third switch "3," and the desired adjustments to the nearest thousandth of an inch are set using the fourth switch "4." The first set of switches SW–1 to SW–4 are positioned to set in a modifying number 0.678, for example. The upper switch SW–1 is set on its "zero" position, the tenths switch SW–2 is on its "six" position, the hundredths switch SW–3 is on its "seven" position, and the thousandths switch SW–4 is on its "eight" position.

According to this differential resolver method of modifying end point data read from a particular block of data on the tape, the digital information as to end position modification dialed in the foregoing manner into a set of four switches is combined in the differential resolver RD with the electrical analog signals (sine and cosine voltages) converted from this digital tape derived information. In keeping with the present invention, wide range adjustments may be made for individual machining steps or for a series of steps and information read from the tape is used to select the desired wide adjustment from storage. To this end, means are provided for selecting a particular set of switches SW–1 to SW–4 for a particular machining step or steps. As herein shown in FIG. 13, the signal from the block of data on the tape which happens to designate turret position is utilized to designate a set of switches corresponding to the turret position. Here, where provision is made for wide range adjustment along different axes, means are also provided for selecting a set of switches from either the bank of X axis switches 300 or the bank of Y axis switches 302, according to whether the dimension for a particular end position is to be measured along the X axis or the Y axis. In other words, provision is made for selecting between the X axis adjust switches 300 or the Y axis adjust switches 302 in addition to selection of a particular set of five possible sets, and the selected switches are used to modify the programmed end point data.

A minus switch MS is also provided with each set of switches SW to extend still further the range of adjustment. This minus switch MS allows for adjustment in either direction along each of the axes. These minus switches are connected as shown to a minus relay MR (FIG. 14).

Still referring to FIG. 13, to carry the foregoing into practical operation turret position relays TPR are provided in association, respectively, with each one of the sets of switches in the X axis bank 300 and in the Y axis bank 302. These turret position relays TPR are energized according to the turret position designated from the tape. Furthermore, an X adjust relay XAR is associated with the X axis switch bank 300 and a Y adjust relay YAR is associated with the Y axis switch bank 302. Each block of data from the tape will contain, in keeping with the present system, information as to the axis along which the end position is to be measured so that the input reader A will produce a signal which will designate from the tape either the X adjust relay XAR or the Y adjust relay YAR. By energizing either the X adjust relay XAR or the Y adjust relay YAR, a source of potential B+ will be connected through the relay contacts to the input conductors 306, 308 energizing either the X axis or Y axis bank of switches. Furthermore, depending on the turret position signal from the input reader A, one of the turret position relays TPR–1 to TPR–5 will be energized to close its contacts and connect the energized input conductors 306, 308 to one set of switches.

Each switch of a set SW–1 to SW–4 provides means for dialing in manually one place of a four place number and is herein shown as a ten position switch having ten contacts to provide means for setting in and storing any digit zero through nine. Each switch may be set to any one of its positions manually. The ten contacts of each switch are connected, respectively, to ten wire groups 310–1 to 310–4 as shown in FIG. 13. The ten wire group 310–1 connected to the switch numbered SW–1 for the X axis bank 300, for example, is connected across the switch numbered SW–1 of the corresponding set for the Y axis bank 302. A ten wire group 310–2, 310–3, 310–4 is similarly connected between the switches of each set for the Z bank to the corresponding switches of the Y bank. To each ten wire group 310–1 to 310–4 there is connected a ten bus group 312–1 to 312–4 which leads downward in the diagram of FIG. 13 for connection to digit relays DR shown in association with the differential resolver circuit of FIG. 15. With this arrangement there are four ten bus groups 312–1 to 312–4, one ten bus group for conveying each digit of a four digit modifying instruction stored in a set of switches SW–1 to SW–4. A four place or four digit end position modifying instruction will, therefore, be carried to the differential resolver circuit by four energized buses with one energized bus from each of the four ten bus groups 312–1 to 312–4 representing one digit of the four digit modifying number.

For each resolver 90, 91, 92, a digital-to-analog converter of the type described in my copending application Ser. No. 763,103, entitled "Positioning Control Apparatus," is employed. Each converter supplies analog signals representing two digits of a four digit end point address. Thus, in an apparatus as described herein employing three (coarse, medium and fine) resolvers 90, 91, 92, the end point address derived from the tape is in the form of a four digit number, and the coarse resolver 90 is supplied with analog signals from one converter representing the desired position or address of the machine member according to the two highest order digits of this four digit decimal number. For example, for the address 1.234″, the first resolver will produce a null signal at a position of the rotor representing 1.2″; that is, at an angle of $$\frac{12}{100} \times 360. = 43.8°$$

The sine and cosine analog voltages when resolved will produce a field vector at this angle. In a similar manner, the medium resolver 91 is supplied with analog signals from the medium analog-to-digital converter representing the desired position of the machine member according to the second and third digits, considered in descending order. The fine resolver is supplied with analog signals from the fine digital-to-analog converter according to the third and fourth digits. With a four digit number representing the desired position of the element 64 of the value 1.234″, as above noted, then the coarse synchro 90 will produce a null or zero output based on the coarse number 1.2″. The synchro devices 91, 92 will produce repeating null outputs based on the medium and fine numerical values 0.23″ and 0.034″, respectively.

It will also be understood that each of the syncro devices or resolvers 90, 91, 92 of FIG. 14 is connected to supply its error signal to a corresponding one of the discriminators 94, 95, 96. These discriminators are constructed and arranged to produce a deadband of response or null point, and in the operation of the control system null points are produced successively in the coarse, medium and fine resolvers as the machine element moves toward the end point. A null point will be reached first in the coarse resolver when the distance to the end point comes within its deadband of response, and the machine element then will be within the target range of the medium resolver. When the medium resolver produces a null the machine element is within the fine resolver target range. As described in a previous section, means is included to slow down the feed rate of the machine element in anticipation of the final end point, so that the machine element creeps toward the end point until the fine resolver produces a null point which, via the control circuit, causes the machine element to stop. Since it is contemplated that this slowdown feature will be the same with the present system, the description will not be repeated.

In the operation of the system with wide range adjust, the magnitudes of the highest order digits of the modifying instruction are reflected by the state of the digit relays DR. The contacts for these relays DR are in the differential resolver circuit which has the effect of combining the tape derived signals and the modifying instruction. In a like manner the digit relays DR for the medium resolver channel and for the fine resolver channel convey the digits of the modifying instruction to the transformer circuits simulating a differential resolver associated with the channels for the medium and fine resolvers. Hence, the operation of the resolvers to produce null points and responsive thereto to govern the motion of the machine element, is not changed and is the same as was previously described in connection with the operation of the control system for small dimensional adjustment. Taking, for example, an illustrative end point address 1.234″, the sine and cosine voltages from the coarse digital-to-analog converter may be depicted as vectors S and C in FIG. 17, for the highest order digits 1.2; these vectors S and C produce a resultant field vector I. With this differential resolver method of modifying such an end point address, the magnitudes of the sine and cosine voltage vectors S, C, are modified by means of the differential resolver RD according to the adjustment number, so that the angle $\alpha$ of the resultant vector I is changed to a new angle $\alpha_1$, representing the modified end point. Referring to FIG. 17, the resultant vector I is changed to the vector II by subtracting $C_1$ from the cosine voltage vector and by adding $S_1$ to the original sine voltage vector. Thus, the electrical analog voltages representing end address derived from the tape are combined with adjustor derived signals, and the resultant sine and cosine voltages are supplied to each resolver so that the field vectors of the resolvers represent in analog form the modified instruction or address. Null voltages will then be provided from the resolvers at the modified end point.

Turning now to the details of the differential resolver RD, a circuit simulating such a device is shown in FIG. 15. Since a differential resolver RD will be provided in each of the channels to the coarse, medium and fine resolvers 90, 91, 92, for convenience in description the differential resolver for the coarse resolver is shown in FIG. 15, although it will be understood that the same device will be provided for the other resolvers.

The circuit in FIG. 15 is shown as receiving at the left side of the circuit the incoming tape derived signals from the coarse digital-to-analog converter over input sine and cosine voltage conductors 314, 316, respectively, and a common 318. At the right side of the circuit the output sine and cosine voltage conductors 320, 322 are shown and the common 318, for conveying the modified sine and cosine analog voltages to the coarse resolver 90. Above the circuit there are shown the digit relays DR representing the two highest order digits of the modifying instruction which are energized by the two ten bus groups 312–1, 312–2 from the wide range adjustment selection storage switches.

The transformer circuit analog sine voltage section receives as an input voltage between conductor 314 and the common conductor 318, an A.C. voltage representing the analog sine voltage for the coarse two places (Example 1.2) of the end point address number. This voltage may be expressed as:

$$A_1 = E \sin \omega t \sin \alpha$$

The output from the analog sine voltage section represents the modified sine voltage which is conveyed to the sine winding of the coarse resolver 90. This output voltage may be expressed as:

$$A_4 = E_1 \sin \omega t \sin (\alpha - \theta_1 - \theta_2)$$

The analog cosine voltage section similarly receives an input voltage between conductor 316 and the common conductor 318, representing the analog cosine voltage for the coarse two places of the end point address number. This voltage may be expressed as:

$$B_I = E \sin \omega t \cos \alpha$$

The output from this section is conveyed to the cosine winding of the coarse resolver 90 and may be expressed as:

$$B_4 = E_1 \sin \omega t \cos (\alpha - \theta_1 - \theta_2)$$

To provide wide range adjustment of end point address in either the plus or minus direction, it is contemplated that a minus switch SM will be provided in association with each set of wide range adjust switches SW–1 to SW–4, as shown in FIG. 13. These switches actuate a relay MR which has normally closed contacts MR–1, MR–4 and normally open contacts MR–1, MR–3 in the differential resolver input such that when the minus switch is closed, the modifying instruction will be subtracted from the tape derived end point address rather than added to it, as in the case where the minus switch SM is not closed. To achieve this result, the switching network at the input side of the differential resolver is provided to cross the incoming conductors 314, 316, as shown.

The sine voltage and cosine voltage sections of the transformer circuit are similarly arranged. Each section includes a first transformer 324, 325 the primary winding of which receives the input voltage and provides means to generate or derive an A.C. voltage which is a predetermined trigonometric function of an angle related to the highest order digit of the modifying instruction. For this purpose the primary winding is non-linearly tapped at five points to provide voltages representing steps of 36° and which may be expressed as follows:

For the sine voltage section:

$$A_2 = E \sin \omega t \sin \alpha \cos (18° + \theta_1)$$

(with $\theta_1$ in steps of 36° according to the highest digit number).

For the cosine voltage section:

$$B_2 = E \sin \omega t \cos \alpha \cos (18° + \theta_1)$$

Taking for illustration, the highest order digit to be "$a$," and the next highest digit to be "$b$," the ten bus groups for these digits will have ten relays $a_0$ to $a_9$, one of which will be energized to represent the magnitude of the digit. The taps on the first transformer primary winding are connected as shown through contacts $a_0$–1 to $a_9$–1 of the "$a$" digit relays $a_0$ to $a_9$, so that the magnitude of the angle $\theta_1$ in the above expression for $A_2$ or $B_2$ will be adjusted in steps of 36° according to the highest order digit "$a$" number.

This voltage $A_2$ or $B_2$ is conveyed to the center tap of the secondary winding of a transformer as shown. In this circuit the first transformer 324 in the sine voltage section provides the secondary winding 324–S for the cosine voltage section. Similarly, the first transformer 325 provides the secondary winding 325–S for the sine voltage section. The secondary windings are linearly tapped with the tap connections leading through contacts of the highest order digit "$a$" relays so that the voltage at the point $A_3$ will be a summation of the voltage $A_2$ and a voltage which is a predetermined trigonometric function of the input cosine voltage related to the highest order digit. $A_3$ may be expressed as follows:

$$A_3 = A_2 - B_1 \sin (18° + \theta_1)$$

$$A_3 = E \sin \omega t \sin [\alpha - (18° + \theta_1)]$$

The voltage at the point $B_3$ in the cosine voltage section will be:

$$B_3 = B_2 + A_1 \sin (18° + \theta_1)$$

$$B_3 = E \sin \omega t \cos [\alpha - (18° + \theta_1)]$$

The voltages $A_3$ and $B_3$ are connected as shown to the center taps of transformer secondary windings. The primary windings 326–P, 327–P for the transformer secondary windings 326–S, 327–S are found in the other sections. These secondary windings 326–S, 327–S are linearly tapped to represent 3.6° steps and the tapped outputs are connected through contacts $b_0$–1 to $b_0$–9 associated with the next highest order digit relays $b_0$ to $b_9$ such as to produce at point $A_4$ an output voltage which may be expressed as follows:

$$A_4 = A_3 + B_3 \tan (18° - \theta_2)$$

$$A_4 = E \sin \omega t \sin [\alpha - \theta_2 - \theta_2]$$

(with $\theta_2$ in steps of 3.6° according to the next highest order digit number).

The voltage at $B_4$ is as follows:

$$B_4 = B_3 - A_3 \tan (18° - \theta_2)$$

$$B_4 = E_2 \sin \omega t \cos (\alpha - \theta_1 - \theta_2)$$

(with $\theta_2$ in steps of 3.6° according to the next highest order digit number).

*Differential resolver method—operation*

Let it be assumed that a tape has been prepared for a series of machining operations for a vertical turret lathe, such as the machine tool shown in FIGURE 1. The operator will trial run through these operations, setting in the wide range adjustments for the tool in the first turret position and, by means of the small distance adjustors, as described previously, adjustments for each step carried out with this tool to provide extremely fine adjustments of each end point.

For example, with a boring bar in turret position #1, the operator will allow the bar to be moved horizontally, illustratively, to a first end point, at a position over the work. This will be an automatic operation under the control of the tape. At this first end point the cutting edge of the tool should be a known distance away from the work surface. However, if it is assumed that the tool is shorter than the programmed tool length, with the present system the operator will jog the bar down to the proper height, which will be a measured distance. If it is further assumed that the actual X axis tool standout is greater than that allowed by the programmer, the operator will jog the saddle to the right in FIGURE 1 the required distance. The X axis and Y axis distances that the operator moved the tool are the wide range "tool adjust" adjustments that are required to be taken into account to carry out repetitive machining operations with the tool in turret position #1.

The present system provides for achieving this end by the operator setting in and storing in the first set of switches SW-1 to SW-4 (corresponding to turret position #1) of the X axis bank 300, the amount which the tool was moved along the horizontal X axis. Similarly, the Y axis adjustment is set in the first set of switches SW-1 to SW-4 of the Y axis bank 302. With the same adjustments effective for each operation involving the tool in turret position #1, these operations may be repetitively carried out.

If it is desired to provide some means for visually indicating to the operator, automatically, which particular ones of the wide range adjust switches should be set to afford the requisite adjustment such means may readily be provided, as, for example, phase sensitive devices serving the function of null meters connected, as shown in FIG. 11, in the discriminator circuits. with such devices, after the operator jogs the tool in turret position #1 down (Y) to the proper height for that particular tool, and over (X) the required horizontal distance, certain or all of the null meters will show an off-null position for the associated resolvers. This serves to indicate that the adjustment switches SW-1 to SW-4 are to be set to produce a null at the adjusted end point. If the coarse resolver is off null, this indicates that the operator should move switches SW-1 and SW-2 to a position where the coarse null meter reads null. In effect, the highest order digits of the programmed, tape-derived address for the end point has been adjusted by adding a modifying instruction so that the coarse resolver produces a null signal at the adjusted end point. Similarly, if either of the other null meters indicate that the associated resolvers are off-null, the corresponding switches should be positioned to where the null meters read null.

The same procedure will be followed for each of the other turret positions. Some cases will result in adjustments for tool length, in other cases the adjustments will be for tool standout, and in some cases adjustments will be required for both. Furthermore, for each machining step individual small adjustments may be made by means of the adjustors Q to account for tool wear, measurement or other small errors that vary for each machining step. In this manner the entire machining program will be run through on a trial basis and the small and wide range adjustments set into storage such that when the program is repeated fully automatically the machine tool will carry out all machining operations to end points modified according to the stored modification instructions.

It will be understood that while the means and system for end point adjustment has been described in connection with a two axis system, the principles hereof are applicable to multiple axes of control without limitation to the number of axes by following known procedures and the teachings hereof.

Digital summing method

The method of wide range adjustment involving differential resolvers for combining tape derived and adjustment signals, described in the previous section, had as its primary objective to provide at the machine tool a means which permits the operator to dial in adjustments along two axes to adjust for tool length and tool standout for different tools. The system diagrammatically shown in FIG. 6 illustrates this method. It is contemplated that in this system provision for making small distance adjustments will also be retained, in the form of trimming potentiometers P described in an earlier section. Thus the control system includes a two axis "tool adjust" as well as a provision for making small adjustments of programmed end points. These small adjustments could be made for each machining step in a program. With the tool adjust provision, the same adjustment would affect all steps where the same tool is used.

A further embodiment of the invention, illustrated as a control system in FIG. 7, carries forward these principles. In this embodiment, the programmed tape derived data is combined with the wide range adjustment or modifying data at a stage in the system before the analog signals are resolved into error signals indicating displacement or distance to the end point. In a general respect, therefore, the present system is similar in arrangement to the system for wide range adjustment including differential resolvers. The combining of the two numbers representing respectively end point address and wide range adjustment, however, is accomplished in the present system before the tape derived number representing end point address is converted into analog voltages. In this particular respect, the present system represents an alternative embodiment of the invention to the differential resolver embodiment.

Turning, therefore, to FIG. 7, it will be understood from this diagram that the end point address is read out of each block of data on the tape by the data reader A and is stored by means of end position storage stepping switches. In the present case, a stepping switch having two decks SS1, SS2 (FIG. 16) is associated with each digit of the end point address. Four such switches will provide storage for a four digit number. Each switch will be driven to a position or state representing the respective digit by the tape reader. Upon reading a block of data, the reader will drive all four switches to positions representing the end point address of that block of data. The machine tool members will be driven to each end point address before the stored number representing that address is cleared from the switches and the switches driven to new positions representing the end point address for the succeeding block of information on the tape.

FIG. 16 illustrates a switch with two decks SSI for the highest order digit of the end point address number. With a switch and connections as shown to relays $a_0$ to $a_5$, one digit of the end point address decimal number is converted to a biquinary code represented by the state of the relays $a_0$ to $a_5$. Similar circuits will be provided for the other digits. The addition previously referred to, of the wide range adjustment number dialed in at the machine tool, to the end point address number, is achieved by an adder circuit S, herein shown in block diagram in FIG. 7. With the end point address and the wide range adjustment both in biquinary code, a relatively simple calculating circuit will serve the adder function, as described, for example, on pages 462–474 of "The Design of Switching Circuits," Keister, Ritchie & Washburn (1951 Edition).

Any suitable switch arrangement may be used for setting in and storing the desired wide range adjustments, such as the separate X axis and Y axis banks of switches 300, 302 shown in FIG. 13 and previously described. Each bank includes five sets of switches in the switch panel shown, one set for each turret position. With this arrangement, a separate set of four switches SW1 to SW4, one switch for each digit of an adjustment number, is provided for each tool mounted on a five-face turret. Additional sets of switches could be included where more tools are involved or to satisfy other requirements. This system contemplates that the machine tool members, when in the machining mode, will be driven along only one of either the X axis or the Y axis, as shown in FIG. 1A, and that the axis designation on the tape will be used for also designating which of the banks of switches will be affected by a given machine step. This is achieved by energizing either the axis designation relay XAR and closing its contacts XAR1 or the Y axis designation relays YAR and closing its contacts YAR1. Four ten bus groups lead downward in FIG. 13 from the switch panel to convey the adjustment number dialed in by means of the switches. One ten bus group is provided for each digit of the four digit adjustment number. The buses of each group are numbered 0 to 9 and the energized bus of each group will represent the number for the respective digit.

Referring now to FIG. 16, a ten bus group illustratively for the highest order digit "a" of the adjustment number, is shown at the top of the figure leading from FIG. 13. This ten bus group is connected as shown to a switching circuit for converting the incoming number for the highest order digit to biquinary code so that the number will be in a form acceptable to a biquinary adder "S." This circuit includes relays $b_0$ to $b_5$ which are energized directly by the buses 0 to 5 of the incoming ten bus group. Also included are relays $b_6$ to $b_9$ which have contacts $b_{6-1}$ to $b_{9-1}$ in a parallel circuit connected to the "five" relay $b_5$. With any higher numbered bus energized, by this means the "five" relay $b_5$ will be energized. Second contacts $b_{6-2}$ to $b_{9-2}$ are found in circuits from a source of potential conventionally shown as $b+$ through a bus to the "zero" through "four" relays $b_0$ to $b_4$. By this means with any higher numbered incoming bus energized, in addition to the "five" relay being energized the smaller numbered relay is also energized which has a number the sum of which, when added to five, equals the incoming bus number. In this manner the state of the relays $b_0$ to $b_5$ constitute in biquinary code the digit number conveyed to the circuit by the energized bus of the ten bus group.

A similar circuit will be provided for each ten bus group such that each digit of the adjustment number will be represented in biquinary code.

The modified Y end point address from the output of the adder S is then applied to digital-to-analog converters which may take the form illustrated and described in my copending application Ser. No. 763,103, filed Sept. 24, 1958, and entitled "Positioning Control Apparatus." As disclosed in this application, the highest order digits of a tape derived end point address are conveyed to a digital-to-analog converter for the coarse resolver. Similarly, the lowest order digits are conveyed to a digital-to-analog converter for the fine resolver. With a four digit number, as in the present case, the second and third digits are conveyed to a converter for the medium resolver. As also described in this copending application, the inputs to the converters are in the form of multi-deck stepping switches A and B for two digits. To convert the modified end point address which is in biquinary code from the output of the adder S to a form acceptable to the converters, a biquinary code to decimal converter circuit, as shown in FIG. 16, may be utilized. It will be seen that each digit of the modified end point address is represented in biquinary code by the state of the relays $c_0$ to $c_5$. Contacts of such relays $c_0$ to $c_5$ are arranged in trees 340 to substitute for the decks, respectively, of the switches A and B of the digital-to-analog converter circuits.

Referring to FIG. 7, the same adder S may be used to add a tape derived address in biquinary code (in either axis of control) and the adjustment member for the axis selected by means previously described in connection with FIG. 13. It should be understood, however, that while FIG. 16 illustrates only the decimal to biquinary code converter circuit for the highest order digit "a," a similar circuit will be provided for the other three digits of a four digit address. Likewise, on the output side of the circuit a set of six relays provides the number for each digit and like circuits are included for the other digits of the four digit number which would be supplied from the adder and which constitutes the sum of the address and the adjustment. The state of the output relays of the adder represent in biquinary code the modified end point address which is supplied directly to the transformer circuits used for digital-to-analog conversion via the contact trees 340 functionally designated in FIG. 16. By means of the digital-to-analog converter circuits the modified end point address is converted to analog sine and cosine voltages supplied to the X axis or Y axis resolvers according to whether the axis of motion is along the X axis or the Y axis.

Digital summing method—operation

The operation of a machine tool equipped with a control system providing both small and wide range adjustments has been described in connection with the differential resolver method of combining analog voltages representing end point and adjustment data. The operation of the machine with a control system as shown in FIG. 7 is essentially the same. Thus, a programmer will analyze a series of machining operations involving one or more tools and will prepare a tape for directing the machine tool through these operations. With more than one tool in the turret, in addition to data for point-to-point positioning of the machine tool members the program will include data as to indexing of the turret to move a desired tool into operative position. Each information block also includes data as to feeds and speeds as well as mode selection.

With such a tape in the machine tool director and a workpiece mounted on the table, the operator will conduct a trial run in which each step of the process is controlled by direction from the tape but at each end point the machine tool members will come to a stop. This permits the operator to determine whether the tool is actually at the desired end point and to set in small adjustments by means of the adjustors P to correct for any differences between actual and desired position.

The provision for wide range adjust as herein disclosed permits the operator to set in adjustments for tool length and tool standout. With such a provision in the control system, the programmer can program movement of the point O in FIG. 1A, and the X and Y distances from point O can be set in by the operator for each tool in the turret. After the trial run is completed, the process may be repeated automatically under complete control of the tape. Should the tool have to be changed or sharpened during machining of the workpiece, the wide range adjustment for that tool may readily be revised.

Further apparatus embodiments

In the preceding sections, numerically controlled positioning systems have been disclosed for controlling machine tool members to move to successive positions along different axes in accordance with a repeatable program of successive positioning steps. The systems have been disclosed in connection with a vertical turret lathe, although it will be understood that such systems have utility in connection with other types of machine tools. With a vertical turret lathe, for example, adjustments in programmed data may be made along the vertical axis, which in reference to FIG. 1A, has been called the conventional Y axis. Adjustments may also be made in the vertical plane along the conventional horizontal X axis as illustrated in FIG. 1A.

The preceding description has related to two embodiments of the invention: differential resolver method and digital summing. In both cases the systems are two axis (X and Y) system as shown in FIG. 1A. Such systems require for each axis of control, components to serve the functions functionally designated either in FIG. 6 or FIG. 7. Thus, where the Y axis motion is provided by a vertically movable ram carried by the saddle and driven by a lead screw (which elements, for convenience in description have been omitted from the diagrams of FIGS. 6 and 7), instead of the machine saddle 30 the machine element positioned in Y axis motion will be the ram. The drive means I will likewise be the ram positioning means instead of the saddle feed means.

For practical reasons, it is highly desirable to share the same circuit and other apparatus wherever possible. In the case of the machine tool in FIGURE 1, where programmed X axis and Y axis motions are involved, common use of certain components is feasible, such as the "end position storage stepping switches" and the "digital-to-analog converters" both in FIGS. 6 and 7, and the digital-decimal to biquinary converters, the adder, and the digital-to-analog converters in FIG. 7. Each drive screw, of course, includes a separate set of resolvers herein described as coarse, medium and fine resolvers 90–92.

In the case of the system of FIG. 6, the circuits simulating a differential resolver may be shared and thus the X axis and Y axis adjust switches in FIG. 13 have been shown connected to common ten bus groups which lead to relays (FIG. 15) for supplying the X axis or Y axis adjustments to differential resolver circuits. The circuit simulating a differential resolver for the coarse resolver channel and accepting the two highest order digits has been illustrated. A similar circuit will be connected to each of the medium and fine resolvers. Suitable switching will be provided so that X axis resolvers or the Y axis resolvers are connected to the differential resolver circuits according to which axis of motion and control is involved.

Provision is included in the systems shown in both FIGS. 6 and 7 for dialing in at the machine tool both narrow and wide range adjustments. Furthermore, it will be evident that the principles hereof may readily be extended to a three axis system; that is, provision for either wide range adjustments or both narrow and wide range adjustments may be included in the system for one, two, or all three axes of motion and control, by including position sensing devices or resolvers for each axis and providing the control circuit portions, shown illustratively for two axes in FIGS. 6 and 7, for all three axes.

One particularly useful application of such a three axis system is shown by FIG. 18 which diagrammatically depicts a horiontal spindle of, illustratively, a horizontal boring mill, and the X, Y and Z axes as conventionally related to this spindle. In FIG. 18 there is also diagrammatically shown a control panel CP for this machine having different sections associated with the X, Y and Z axes, respectively. In keeping with the present invention, the control panel CP in FIG. 18 includes means permitting wide range adjustments on each of the three axes of control. Such a provision has particular utility in connection with the following machine-work arrangements, as will become evident.

It is contemplated to include control means on the panel CP for setting in separate wide range adjustments along the X axis. Thus the panel includes two sets of X axis adjust switches corresponding, respectively, to work station #1 and work station #2 along the X axis, as indicated in FIG. 18. Each switch set includes five switches to provide means for dialing in a five digit number. With four instead of three resolvers (as described supra), including an additional coarse resolver driven at 1 revolution per 100" of linear motion of the spindle along the X axis, the range of adjustment along the X axis will be up to 50", for illustrative purposes. A 500" range may readily be provided by adding a further resolver to the system.

Such separate sets of X axis adjusters in the present case provide means for origin adjust along the X axis. One set of the switches provides for adjusting the origin to align the programmed data or electrical frame of reference with the actual workpiece frame of reference at work station #1, and the second set of switches provides for aligning such at work station #2. With this arrangement, the machine tool can be caused to execute programmed machining steps at station #1 under direction from the tape. In a trial run the wide adjustment required for alignment at station #1 can be made. The toggle switch TS on the control panel CP is set for this purpose on position #1 and the adjustment on switches SW1–5 of set #1 will then be effective. During the same period that the machining operations are being performed under tape control at station #1, one of the operators may be setting up the work at station #2.

After the piece at station #1 is machined, the operator will move the toggle switch TS to position #2 which will cause the adjustment dialed in by means of the second set of switches to be combined with the tape derived data, and, in effect, move the spindle to work station #2 and cause the same series of machining steps to be carried out at the new location on the new workpiece.

As a further means of illustrating how the invention may be applied, the system diagrammatically shown in FIG. 18 includes in addition to origin adjust along the X axis, means for dialing in a single wide range adjustment along the Y axis. This Y axis adjustment would be applicable at either work station #1 or work station #2 (or any other position of the spindle along the X axis). As an example, the provision for wide Y axis adjustments allows the operator to adjust for the thickness of a pallet on which the workpiece is mounted at the work stations. It is foreseen that most adjustment problems can be met with this arrangement where the same adjustment will be provided for all instances of X axis positioning, and thus no means is included for setting in different adjustments for different steps or for different locations as in the case of the X axis controls.

As a further means of illustrating the invention, the system in FIG. 18 further contemplates means for adjustment along the Z axis. In the present case this means takes the form of a wide range adjustment for tool length. Thus the operator, by using the Z axis switches, can set in distances to be added to (or subtracted from) the programmed Z axis end points. Further, so as to allow different adjustments for different tools, a plurality of banks of Z adjust switches are included, herein shown as five such banks for illustrative purposes. As in the systems of FIGS. 6 and 7, means is included for selection of one particular bank of Z axis switches for a particular tool. If provision is made for automatic tool changing, for example, and more than five tools are involved in a machining program, more than five banks of switches for Z axis adjust will be needed but such can readily be added. In the present case, five banks of switches affords an illustration of separate switch means, adapted to be selected from the tape according to data on the tape, such that a particular preset adjustment will be automatically combined with the tape end point data for Z axis control.

Emphasis has been directed in this section to the control panel CP and the separate sets of X axis, Y axis and Z axis controls on such panel. The details of how the system will be constructed and arranged has been described in earlier sections. It will be understood that in keeping with the invention the system may follow either the differential resolver method of combining adjustment data and tape derived data, the digital summing method, or an equivalent method. Referring to FIG. 6, if the system is constructed in accordance with the differential resolver method, each of the X axis, Y axis and Z axis systems would include components to provide the functional designations identified in the blocks labelled "end position storage stepping switches," "digital-to-analog converters," "differential resolvers," "resolvers," "discriminators" and the connected drive means for positioning the machine elements along the particular axis of motion. Wherever possible, the same apparatus will be used for carrying out the same function in different portions of the system. Hence, in the present system where programmed motion is along only one axis at a time, the same stepping switches might be used for end position storage despite which axis of control happens to be involved with suitable switching to connect the stepping switches to the active adjust switches on the control panel CP.

In the case of the Z axis tool adjust, futhermore, the functionally designated component "wide range selection storage" provides means for selection of the particular bank of Z axis adjust switches. It will be understood that if no small adjustment provision is included, no components would be required to serve the functions of selected adjustor storage and "adjustors."

Turning to FIG. 7, where the digital summing method is followed, the system will include for each axis of control, as in the case just described, components to serve the functions of "end position storage stepping switches," "resolvers" and "discriminators." Such a system would further include the "decimal to biquinary code converters," "adder," and "digital-to-analog converters." Wherever the same equipment can be shared by different circuits, actual apparatus embodiments of the invention may be designed to take advantage of such an arrangement.

I claim as my invention:

1. In a system for controlling the positioning of a movable machine tool member in accordance with a repetitive program, the combination comprising a member mounted for movement, means for moving said member to successive positions, a reader responsive to successive blocks of information supplied thereto for creating successive sets of position information signals indicative of the desired positions of said member and for creating coded selection signals from at least some of said blocks, control means connected to receive said sets of position information signals and connected to said moving means for causing the latter to move said member to the corresponding positions, and means for modifying the operation of said control means, said last-named means comprising a plurality of adjustable signal sources, means responsive to each of said coded selection signals for selecting one of said sources to be effective during positioning of said member according to the corresponding set of position information signals, and means for superimposing the output of said selected signal source on said control means, whereby said member is caused to move to a position displaced from that designated by a set of position information signals according to the adjusted output of the selected source.

2. In a positioning system for controlling the positioning of a movable machine tool member in accordance with a repetitive program, the combination comprising a member mounted for movement, means for moving said member to successive positions, a reader responsive to successive blocks of information supplied thereto for creating successive sets of position information signals and for creating from at least some of said blocks coded selection signals, means for comparing each set of position information signals with the actual position of said member to derive an error signal indicative of the position error, control means connected to receive said error signal and connected to said moving means for causing the latter to move said member until said error signal is reduced to zero, and means for modifying the operation of said control means, said last-named means comprising a plurality of adjustable correction signal sources, means responsive to each of said coded selection signals for selecting and rendering effective a corresponding one of said sources, means for algebraically combining the correction signal from the selected source with said error signal to produce a composite control signal, and means connecting said composite control signal to said control means so that the latter causes movement of said member to a position at which the composite control signal is reduced to zero.

3. In a positioning system for controlling the positioning of a movable machine tool member in accordance with a repetitive program, the combination comprising a member mounted for movement, means for moving said member to successive positions, a reader responsive to successive blocks of digitally represented information supplied thereto for creating successive sets of digital position information signals and for creating from at least some of said blocks digital coded selection signals, means for converting each set of digital information signals into analog signals representing the desired position of said movable member, means for comparing the analog signals with the actual position of said member to derive an error signal indicative of the position error, control means connected to receive said error signal and connected to said moving means for causing the latter to move said member until said error signal is reduced to zero, and means for modifying the operation of said control means, said last-named means comprising a plurality of adjustable sources of analog correction signals, means responsive to each of said digital coded selection signals for selecting and rendering effective a corresponding one of said sources, means for algebraically combining the analog correction signal from the selected source with said analog error signal to produce a composite control signal, and means connecting said composite control signal to said control means so that the latter causes movement of said member to a position at which the composite control signal is reduced to zero.

4. In a system for controlling the positioning of a movable machine tool member in accordance with repetitive programs, the combination comprising a member mounted for movement, means for moving said member to successive positions, a reader responsive to successive blocks of information supplied thereto for creating successive sets of position information signals indicative of the desired positions of said member and for creating coded selection signals from at least some of said blocks, first means for storing each set of position information signals, second means for storing each coded selection signal, control means connected to the said first storing means and connected to said moving means for causing the latter to move said member to the position corresponding to the stored position information signals, and means for modifying the operation of said control means, said last-named means comprising a plurality of adjustable signal sources, means responsive to said second storage means for selecting that one of said sources which corresponds to the stored selection signal to be effective during positioning of said member according to the corresponding set of position information signals, and means for superimposing the output of said selected signal source on said control means, whereby said member is caused to move to a position displaced from that designated by a set of position information signals according to the adjusted output of the selected source.

5. In a positioning system for controlling the positioning of a movable machine tool member in accordance with a repetitive program, the combination comprising a member mounted for movement, means for moving said member to successive positions, means for successively storing successive blocks of information supplied thereto to create successive sets of position information signals and to create from at least some of said blocks coded selection signals, means for comparing each set of stored position information signals with the actual position of said member to derive an error signal indicative of the position error, control means connected to receive said error signal and connected to said moving means for causing the latter to move said member until said error signal is reduced to zero, and means for modifying the operation of said control means, said last-named means comprising a plurality of adjustable correction signal sources, means responsive to each of said stored coded selection signals for selecting and rendering effective a corresponding one of said sources, means for algebraically combining the correction signal from the selected source with said error signal to produce a composite control signal, and means connecting said composite control signal to said control mean so that the latter causes movement of said member to a position at which the composite control signal is reduced to zero.

6. In a positioning system for controlling the positioning of a movable machine tool member in accordance with a repetitive program, the combination comprising a member mounted for movement, means for moving said member to successive positions, a program device responsive to successive blocks of information supplied thereto and having means for creating successive sets of position information signals and for creating from at least some of said blocks coded selection signals, means for comparing each set of information signals with the actual position of said member to derive an analog error signal which varies as the position error of said member, control means connected to receive said error signal and connected to said moving means for causing the latter to move said member until said error signal is reduced to zero, and means for modifying the operation of said control means, said last-named means comprising a plurality of potentiometers each having an adjustable wiper to produce an analog correction signal which varies according to the adjustment of the wiper, an algebraic combining device having first and second inputs, means responsive to each of said coded selection signals for supplying the analog correction signal from the corresponding one of said potentiometers to said first input, means for supplying said analog error to said second input, and means for supplying the output of said algebraic combining device to said control means so that said member is moved to a position at which such output is reduced to zero.

7. In a positioning system for controlling the positioning of a movable machine tool member in accordance with a repetitive program, the combination comprising a member mounted for movement, means for moving said member to successive positions, a reader responsive to successive blocks of information supplied thereto for creating successive sets of position information signals and for creating from at least some of said blocks coded selection signals, means for comparing each set of position information signals with the actual position of said member to derive an error signal indicative of the position error, control means connected to receive said error signal and connected to said moving means for causing the latter to move said member until said error signal is reduced to zero, and means for modifying the operation of said control means, said last-named means comprising a plurality of adjustable correction signal sources, means responsive to each of said coded selection signals for selecting and rendering effective a corresponding one of said sources, means for algebraically combining the correction signal from the selected source with said error signal to produce a composite control signal, means connecting said composite signal to said control means so that the latter causes movement of said member to a position at which the composite control signal is reduced to zero, an indicator associated with each of said adjustable signal sources, and means for activating each of said indicators when the corresponding source is rendered effective by said selecting means thereby to display which of said sources is at any instant effective.

8. In a system for controlling the motion of a movable machine tool member to successive positions in accordance with a repeatable program of successive positioning steps represented by successive blocks of data on a record medium, each block of data including indicia representing an original desired position to which said member is to be moved, the combination comprising a reader for successively sensing the blocks on said record medium and converting the indicia in each block into original desired position-representing signals, power means for moving said member, control means connected to receive said position-representing signal and normally operative to cause said power means to move said member to the original position represented by said position-representing signals, means for modifying the operation of said control means, said last-named means comprising a plurality of correction devices each having an element therein adjustable to represent the magnitude of a corrective displacement, means for selectively connecting a different one of said correction devices to said control means during different positioning steps executed by said movable member, and means associated with said control means for causing said power means to move said member to a final position displaced from the original position by an amount corresponding to the adjustment of the element in the selectively connected device, whereby the final positions of said member for different positioning steps may be individually corrected, and the corrections will be repeated automatically as the program is repeated.

9. In a system for controlling the positioning of a movable machine tool member in accordance with a repeatable program of successive positioning steps represented by successive blocks of data on a record medium, each block of data including indicia representing an original desired position to which said member is to be moved, the combination comprising a reader for successively converting the indicia of each block into original desired position-representing signals, a plurality of normally ineffective correction devices each having a movable element adjustable to represent a desired corrective displacement, means for selectively rendering a particular one of said correction devices effective following the reading of the corresponding particular block on said record medium, power means for moving said movable member, and control means jointly responsive to said original desired position-representing signals and the selected, effective correction device for causing said power means to move said member to a final position which is displaced from the represented original position by an amount corresponding to the adjustment of the movable element for that effective device, whereby the final positions of said movable member for different steps in the program may be individually changed relative to the original positions represented on said record medium, and such changes will be automatically produced thereafter as the program is repeated.

10. The combination set forth in claim 8 and further characterized by a plurality of indicators each corresponding to one of said correction devices, and means for activating each indicator when the correction device corresponding thereto is selectively connected to said control means.

11. In a system for controlling the motion of a movable machine tool member to successive positions in accordance with a repeatable program of successive positioning steps represented by successive blocks of data on a record medium, each block of data including indicia representing an original desired position to which said member is to be moved, the combination comprising a reader for successively sensing the blocks on said record medium and converting the indicia in said blocks into successive sets of original desired position-representing signals, power means for moving said member, control means connected to receive said position-representing signals and normally operative to cause said power means to move said member to the successive positions represented by said sets of position-representing signals, means for modifying the operation of said control means, said last-named means comprising a plurality of correction devices each having an element therein adjustable to represent the magnitude of a corrective displacement, means responsive to data in said data blocks for connecting one of said correction devices to said control means to be effective during a positioning step executed by said movable member according to the corresponding set of position-representing signals, and means associated with said control means for causing said power means to move said member to a final position displaced from the original position by an amount corresponding to the adjustment of the element in the connected correction device, whereby the final position of said member for a positioning step may be corrected, and the correction will be repeated automatically as the program is repeated.

12. In a system for controlling the positioning of a movable machine tool member in accordance with a repeatable program of successive positioning steps represented by successive blocks of data on a record medium, each block of data including indicia representing an original desired position to which said member is to be moved, the combination comprising a reader for successively converting the indicia of said blocks into sets of successive desired position-representing signals along one of a plurality of axes, a plurality of sets of correction devices one set for each axis of control, each correction device of a set having a movable element adjustable to represent a desired corrective displacement, means for selectively rendering a particular set of said correction devices effective following the reading of a particular block on said record medium responsive to data in the block designating a corresponding particular axis of control, means responsive to data in said data blocks for selecting one of said adjustment devices of an effective set to be operable during positioning of said member according to the corresponding set of position-representing signals, power means for moving said movable member, and control means jointly responsive for each successive positioning step to a set of said original desired position-representing signals and the selected, operable correction device for causing said power means to move said member to a final position which is displaced from the represented original position by an amount corresponding to the adjustment of the movable element for that operable device so as to provide for individually displacing each of said successive positions.

13. In a system for controlling the motion of a movable machine tool member to successive positions along a plurality of axes of control in accordance with a repeatable program of successive positioning steps represented by successive blocks of data on a record medium, each block of data including indicia representing an original desired position along one of said axes of control to which said member is to be moved, the combination comprising a reader for successively sensing the blocks on said record medium and for converting the indicia in said blocks into successive sets of original desired position-representing signals, a plurality of adjustment devices for producing signals each representing the magnitude of an adjustment to an original desired position, means responsive to data in said data blocks for selecting one of said adjustment devices to be effective during positioning of said member according to the corresponding set of position-representing signals, means for adding block derived signals from said reader and adjustment signals from said selected adjustment device and converting the sum into modified desired position-representing signals for each successive position along one axis, power means for moving said member, means for comparing modified position-representing signals with the actual position of said member to derive an error signal indicative of the position error, and control means connected to receive said error signal and connected to said power means for causing the latter to move said member in each successive positioning step until said error signal is reduced to zero.

14. In a system for controlling the motion of a movable machine tool member to successive positions along a plurality of axes of control in accordance with a repeatable program of successive positioning steps represented by successive blocks of data on a record medium, each block of data including indicia representing an original desired position along one of said axes of control to which said member is to be moved, the combination comprising a reader for successively sensing the blocks on said record medium, means for converting successive block derived signals from said reader into successive sets of electrical signals representing original desired positions along one of said axes, means including a plurality of adjustment devices for producing electrical adjustment signals each representing the magnitude of an adjustment to an original desired position, means responsive to data in said data blocks for selecting one of said adjustment devices to be effective during positioning of said member according to the corresponding set of position-representing signals, means for modifying said original sets of desired position signals by said adjustment signals from said selected adjustment devices into modified desired position-representing signals along one axis, power means for moving said member, means for comparing modified position-representing signals with the actual position of said member to derive an error signal indicative of the position error, and control means connected to receive said error signal and connected to said power means for causing the latter to move said member in each successive positioning step until said error signal is reduced to zero.

15. In a system for controlling the motion of a movable machine tool member to successive positions along a plurality of axes of control in accordance with a repeatable program of successive positioning steps represented by successive blocks of data on a record medium, each block of data including indicia representing an original desired position along one of said axes of control to which said member is to be moved, the combination comprising a reader for successively sensing the blocks on said record medium, means for converting successive block derived signals from said reader into successive sets of electrical analog signals representing original desired positions along one of said axes, means including a plurality of adjustment devices for producing adjustment signals each representing the magnitude of an adjustment to an original desired position, means responsive to data in said data blocks for selecting one of said adjustment devices to be effective during positioning of said member according to the corresponding set of position-representing signals, means including a differential resolver for modifying said sets of position-representing electrical analog signals by said adjustment signals from said selected adjustment devices into modified electrical analog signals representing modified desired positions, power means for moving said member, means including resolvers responsive to the actual position of said member for comparing modified desired position-representing analog signals with the actual position of said member to derive an error signal indicative of the position error, and control means connected to receive said error signal and connected to said power means for causing the latter to move said member in each successive positioning step until said error signal is reduced to zero.

16. In a system for controlling the motion of a movable machine tool member to successive positions along a plurality of axes of control in accordance with a repeatable program of successive positioning steps represented by successive blocks of data on a record medium, each block of data including indicia representing an original desired position along one of said axes of control to which said member is to be moved, the combination comprising a reader for successively sensing the blocks on said record medium and producing sets of digital signals representing successive desired positions, a plurality of adjustment devices each producing a signal in digital form representing the magnitude of an adjustment to an original desired position, means responsive to data in said data blocks for selecting one of said adjustment devices to be effective during positioning of said member according to the corresponding set of position-representing signals, means for adding block derived digital signals from said reader and digital adjustment signals from a selected adjustment device and for converting the sum into electrical analog signals representing modified desired position along one axis, power means for moving said member, means for comparing modified position-representing signals with the actual position of said member to derive an error signal indicative of the position error, and control means connected to receive said error signal and connected to said power means for causing the latter to move said member in each successive positioning step until said error signal is reduced to zero.

17. In a system for controlling the motion of a movable machine tool member in accordance with a program represented by data on a record medium, the combination comprising, a reader for successively sensing the data on said record medium, means for converting record derived signals from said reader into sets of electrical signals representing successive desired positions of said member, means including a plurality of adjustment devices for producing electrical adjustment signals representing the magnitude of adjustments to said desired positions, so as to provide for individually displacing each of said successive positions by a selected adjustment, means responsive to data in said data blocks for selecting one of said adjustment devices to be effective during positioning of said member according to the corresponding set of position-representing signals, means for combining said adjustment and desired position signals to produce modified desired position-representing signals for each successive position, power means for moving said member, means for comparing modified position-representing signals with the actual positions of said member to derive error signals indicative of the displacement distances to said modified desired positions, and control means connected to receive said error signals and connected to said power means for causing the latter to move said member until said error signals are reduced to zero and said member is moved to said modified desired positions.

18. In a system for controlling the movement of a machine tool element to successive positions according to a repeatable program of successive steps, the combination comprising, means responsive to successive blocks of programmed numerical information for moving the element successively to a plurality of end-point positions, a plurality of adjustable devices, means for selecting a certain one of said devices during movement of the element toward a certain one of the end-point positions, means for selectively operating the system in a single cycle mode so that the element remains in the end-point position for each step until re-started, means for selectively operating the system in a manual control mode to enable movement of the element away from an end-point position, means controlled in response to adjustment of the selected device for correctively shifting the end-point position to a precise final position, and means for causing the element to repeat its movement toward the selected end-point position as shifted by the setting of the selected device to ascertain that the final position is reached, and means for restoring the system to automatic cycling operation, whereby repetitions of the program will result in positioning of the element to the corrected final position for each step rather than the end-point position.

19. In a system for controlling end point to end point positioning of a movable machine tool member in accordance with a repetitive program, said member being mounted for movement, including means for moving said member to successive end point positions, the combination comprising, a reader responsive to successive blocks of programmed data supplied thereto for creating successive sets of position-representing signals indicative of the programmed end point positions of said member, control means connected to receive said sets of programmed end point position-representing signals and connected to said moving means for causing the latter to move said member to successive programmed end point positions according to said sets of signals, and means for modifying the operation of said control means so as to provide for individually displacing each of said successive programmed end point positions, said last-named means comprising a plurality of adjustable devices each producing a signal representing the magnitude of an individual displacement from a programmed end point position, means responsive to data in said data blocks for selecting one of said devices to be effective during positioning of said member according to the corresponding set of end point position-representing signals, and means for superimposing the output signals of said selected device on said control means, whereby said member is caused to move to successive end point positions each being displaced from that programmed according to the adjusted output of the selected device.

20. Apparatus comprising in combination, a member; means for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of mechanically adjustable means, each adapted to determine the extent of a movement of said member along said path; means responsive to said programming means for successively rendering effective said mechanically adjustable means; and means responsive to the member arriving at the point along its path of travel to which it is to be moved for rendering effective said step-by-step means.

21. Apparatus comprising in combination, a member; means for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of mechanically adjustable means adapted to supplement said electronic distance determining means; means responsive to said programming means for successively rendering effective said mechanically adjustable means; and means responsive to the member arriving at the point along its path of travel to which it is to be moved for rendering effective said step-by-step means.

22. Apparatus comprising in combination, a member; means for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage, said electronic distance determining means being effective over the entire path of travel of said member; a plurality of mechanically adjustable means, each adapted to determine the extent of a movement of said member along said path, said mechanically adjustable means being effective over only an incremental portion of the entire path of travel of said member; means responsive to said programming means for successively rendering effective said mechanically adjustable means; and means responsive to the member arriving at the point along its path of travel to which it is to be moved for rendering effective said step-by-step means.

23. Apparatus comprising in combination, a member; means for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means responsive to data on said tape and the movement of said member for determining a distance said member moves along its path of motion; and means responsive to said member moving throughout said predetermined distance along its path of motion for rendering effective said indexing means.

24. Apparatus comprising in combination, a member; means for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means adapted to supplement said electronic distance determining means and responsive to data on said tape and the movement of said member for determining a distance said member moves along its path of motion; and means responsive to said member moving throughout said predetermined distance along its path of motion for rendering effective said indexing means.

25. Apparatus comprising in combination, a member; means for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; said electronic means being effective over the entire path of travel of said member; mechanically adjustable means responsive to data on said tape and the movement of said member for determining a distance said member moves along its path of motion, said mechanically adjustable means being effective over only an incremental portion of the entire path of travel of said member; and means responsive to said member moving throughout said predetermined distance along its path of motion for rendering effective said indexing means.

26. Apparatus comprising in combination, a member; a variable speed transmission for moving said member in either direction along a plurality of paths of movement; programming means including a plurality of portions, each adapted to contain command data for effecting the selection of the path, rate and extent of movement of said member along said path; means for causing the portions of said programing means successively to be rendered effective in a step-by-step fashion; an electronic distance determining means including an electronic circuit adapted to cooperate with said member and said programming means for producing an error signal voltage representing the distance between the member and a point along tis path of movement to which it is to be moved; means within said electronic circuit responsive to the movement of the member for nulling said error signal voltage; a plurality of mechanically adjustable means, each adapted to determine the extent of a movement of said member along said path; means responsive to said programming means for successively rendering effective said mechanically adjustable means; and means responsive to the member arriving at the point along its path of travel to which it is to be moved for rendering effective said step-by-step means.

27. Apparatus comprising in combination, a member; a variable speed transmission for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of mechanically adjustable means adapted to supplement said electronic distance determining means; means responsive to said programming means for successively rendering effective said mechanically adjustable means; and means responsive to the member arriving at the point along its path of travel to which it is to be moved for rendering effective said step-by-step means.

28. Apparatus comprising in combination, a member; a variable speed transmission for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage, said electronic distance determining means being effective over the entire path of travel of said member; a plurality of mechanically adjustable means, each adapted to determine the extent of a movement of said member along said path, said mechanically adjustable means being effective over only an incremental portion of the entire path of travel of said member; means responsive to said programming means for successively rendering effective said mechanically adjustable means; and means responsive to the member arriving at the point along its path of travel to which it is to be moved for rendering effective said step-by-step means.

29. Apparatus comprising in combination, a member; a variable speed transmission for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means responsive to data on said tape and the movement of said member for determining a distance said member moves along its path of motion; and means responsive to said member moving throughout said predetermined distance along its path of motion for rendering effective said indexing means.

30. Apparatus comprising in combination, a member; a variable speed transmission for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means adapted to supplement said electronic distance determining means and responsive to data on said tape and the movement of said member for determining a distance said member moves along its path of motion; and means responsive to said member moving throughout said predetermined distance along its path of motion for rendering effective said indexing means.

31. Apparatus comprising in combination, a member; a variable speed transmission for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion, said electronic means being effective over the entire path of travel of said member; mechanically adjustable means responsive to data on said tape and the movement of said member for determining a distance said member moves along its path of motion, said mechanically adjustable means being effective over only an incremental portion of the entire path of travel of said member; and means responsive to said member moving throughout said predetermined distance along its path of motion for rendering effective said indexing means.

References Cited by the Examiner

UNITED STATES PATENTS

| | | |
|---|---|---|
| 2,820,187 | 1/1958 | Parsens et al. |
| 2,875,390 | 2/1959 | Tripp. |

FOREIGN PATENTS

| | | |
|---|---|---|
| 1,114,501 | 12/1955 | France. |

OTHER REFERENCES

Gidding and Lewis Numerical Bulletin NR–1, Sept. 12, 1955, 11 pages.

ANDREW R. JUHASZ, *Primary Examiner.*

LEON PEAR, GERALD A. DOST, DON A. WAITE, *Examiners.*